US010578076B2

(12) United States Patent
Church

(10) Patent No.: US 10,578,076 B2
(45) Date of Patent: Mar. 3, 2020

(54) FLUID-REDIRECTING STRUCTURE

(71) Applicant: Ryan Church, Toronto (CA)

(72) Inventor: Ryan Church, Toronto (CA)

( * ) Notice: Subject to any disclaimer, the term of this patent is extended or adjusted under 35 U.S.C. 154(b) by 199 days.

(21) Appl. No.: 15/501,475

(22) PCT Filed: Aug. 5, 2015

(86) PCT No.: PCT/CA2015/050739
§ 371 (c)(1),
(2) Date: Feb. 3, 2017

(87) PCT Pub. No.: WO2016/019466
PCT Pub. Date: Feb. 11, 2016

(65) Prior Publication Data
US 2017/0218917 A1    Aug. 3, 2017

Related U.S. Application Data

(60) Provisional application No. 62/033,331, filed on Aug. 5, 2014.

(51) Int. Cl.
*F03D 1/06* (2006.01)
*F03D 17/00* (2016.01)
(Continued)

(52) U.S. Cl.
CPC ............ *F03D 1/0666* (2013.01); *B63H 1/28* (2013.01); *B64C 11/18* (2013.01); *B64C 23/072* (2017.05);
(Continued)

(58) Field of Classification Search
CPC .... F03D 1/0666; F03D 1/0608; F03D 1/0625; F03D 1/0633; F03D 1/0675;
(Continued)

(56) References Cited

U.S. PATENT DOCUMENTS 2,472,357 A    6/1949    Wolf
3,941,504 A *  3/1976    Snarbach ............... F03D 3/065
                                                      416/197 A
(Continued)

FOREIGN PATENT DOCUMENTS

CN    101550902 A    10/2009
CN    101616839 A    12/2009
(Continued)

OTHER PUBLICATIONS

Chinese Office Action issued in Chinese Application No. 201580042006. 8, dated Jul. 27, 2018.
(Continued)

*Primary Examiner* — Mahmoud Gimie
(74) *Attorney, Agent, or Firm* — Norton Rose Fulbright Canada LLP

(57) ABSTRACT

A fluid-redirecting structure includes a rigid body having an upstream end, a downstream end, and an axis of rotation, the rigid body incorporating a plurality of troughs each spiralled from a tip at the upstream end to the downstream end about the axis of rotation, the troughs being splayed with respect to the axis of rotation thereby to, proximate the downstream end, direct incident fluid along the troughs away from the axis of rotation.

21 Claims, 17 Drawing Sheets

(51) Int. Cl.
  *B63H 1/28* (2006.01)
  *B64C 11/18* (2006.01)
  *B64C 23/06* (2006.01)

(52) U.S. Cl.
  CPC ......... *F03D 1/0633* (2013.01); *F03D 1/0675* (2013.01); *F03D 17/00* (2016.05); *F05B 2240/221* (2013.01); *F05B 2250/16* (2013.01); *F05B 2250/25* (2013.01); *F05B 2260/30* (2013.01)

(58) Field of Classification Search
  CPC ..... F03D 1/0691; F03D 17/00; B64C 23/072; B64C 11/14; B64C 11/18; B63H 1/28; F05B 2240/133; F05B 2240/221; F05B 2240/30; F05B 2250/15; F05B 2250/16; F05B 2250/183; F05B 2250/25; F05B 2250/611; F05B 2260/30; F05B 2260/96
  USPC ...................................... 416/201 R
  See application file for complete search history.

(56) References Cited

U.S. PATENT DOCUMENTS

| | | | |
|---|---|---|---|
| 4,368,007 A * | 1/1983 | Ely | F03D 1/0608 |
| | | | 416/121 |
| 5,533,865 A | 7/1996 | Dassen et al. | |
| 7,931,444 B2 | 4/2011 | Godsk et al. | |
| 7,944,070 B2 | 5/2011 | Rosenvard et al. | |
| 8,287,243 B2 | 10/2012 | Herr et al. | |
| 8,308,437 B2 | 11/2012 | Bagepalli et al. | |
| 8,899,920 B2 | 12/2014 | Anderson | |
| 8,985,947 B2 * | 3/2015 | Obrecht | F03D 1/0683 |
| | | | 416/62 |
| 2003/0175121 A1 | 9/2003 | Shibata et al. | |
| 2008/0061192 A1 | 3/2008 | Sullivan | |
| 2010/0008780 A1 | 1/2010 | Miocevich | |
| 2011/0018268 A1 * | 1/2011 | Snel | F03D 7/022 |
| | | | 290/44 |
| 2011/0027087 A1 * | 2/2011 | Rokeby-Thomas | F03B 3/121 |
| | | | 416/176 |
| 2011/0085907 A1 * | 4/2011 | Anderson | F03B 3/126 |
| | | | 416/120 |
| 2011/0142642 A1 | 6/2011 | McGrath et al. | |
| 2011/0176920 A1 | 7/2011 | Zhang | |
| 2011/0223034 A1 | 9/2011 | Gerber et al. | |
| 2011/0311363 A1 | 12/2011 | Bills et al. | |
| 2012/0051916 A1 * | 3/2012 | Bagepalli | F03D 1/025 |
| | | | 416/175 |
| 2012/0128475 A1 | 5/2012 | Bailey | |
| 2013/0170999 A1 | 7/2013 | Vassilicos | |
| 2013/0224039 A1 * | 8/2013 | Moser | F03D 3/065 |
| | | | 416/242 |
| 2018/0372069 A1 * | 12/2018 | Church | F03D 1/0691 |

FOREIGN PATENT DOCUMENTS

| | | |
|---|---|---|
| CN | 102575641 A | 7/2012 |
| CN | 204024906 | 12/2014 |
| EP | 2048507 A2 | 4/2009 |
| EP | 2410171 A1 | 1/2012 |
| EP | 2592265 A2 | 5/2013 |
| GB | 2369161 A | 5/2002 |
| TW | 201210695 A | 3/2012 |
| TW | 201210895 | 3/2012 |
| WO | WO0202935 A1 | 1/2002 |
| WO | WO2009016666 A1 | 2/2009 |
| WO | 2011160061 A3 | 3/2012 |
| WO | 2013083130 A1 | 6/2013 |
| WO | WO2014207015 A1 | 12/2014 |
| WO | WO2015067387 A1 | 5/2015 |

OTHER PUBLICATIONS

Extended European Search Report dated Mar. 29, 2018, issued in European Application No. 15830404.8.

* cited by examiner

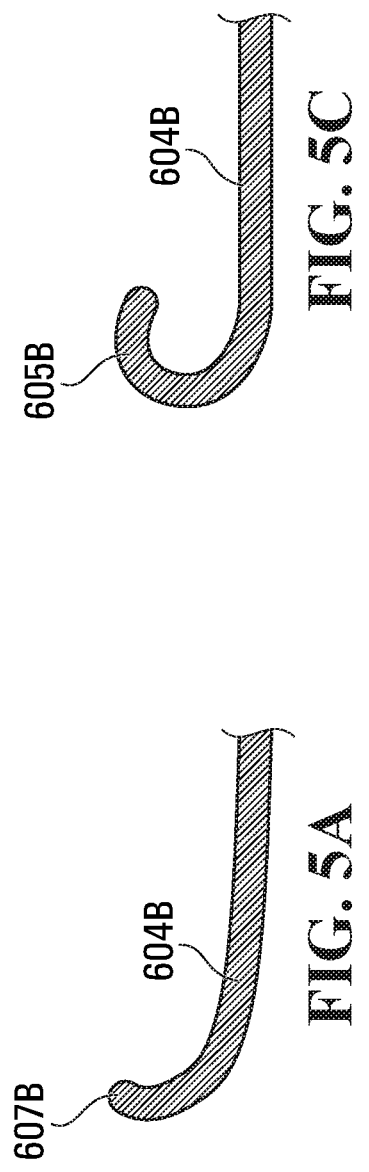
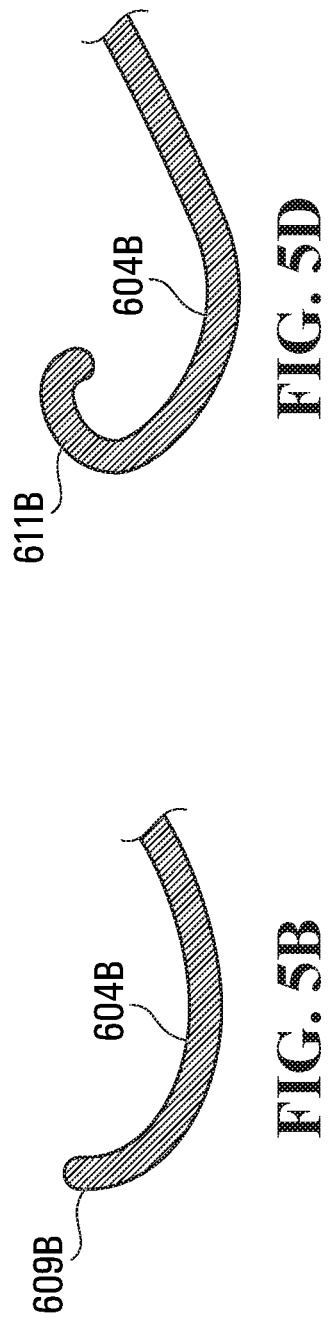
FIG. 5A  FIG. 5B  FIG. 5C  FIG. 5D

FLUID-REDIRECTING STRUCTURE

CROSS-REFERENCE TO RELATED APPLICATION

This application claims priority under 35 U.S.C. 119(e) from U.S. Provisional Patent Application Ser. No. 62/033,331 filed on Aug. 5, 2014, the contents of which are incorporated in their entirety by reference herein.

FIELD OF THE INVENTION

The present invention relates generally to turbines and propellers, and more particularly to a fluid-redirecting structure for a turbine or a propeller.

BACKGROUND OF THE INVENTION

Horizontal-axis wind turbines for generating electricity from rotational motion are generally comprised of one or more rotor blades each having an aerodynamic body extending outwards from a horizontal shaft that is supported by, and rotates within, a wind turbine nacelle. The rotor blades are examples of structures adapted to traverse a fluid environment, where the environment is primarily ambient air. The nacelle is supported on a tower which extends from the ground or other surface. Wind incident on the rotor blades applies pressure causing the rotor blades to move by rotating the shaft from which they extend about the horizontal rotational axis of the shaft. The shaft is, in turn, associated with an electricity generator which, as is well-known, converts the rotational motion of the shaft into electrical current for transmission, storage and/or immediate use. Horizontal-axis wind turbines are generally very well-known and understood, though improvements in their operation to improve the efficiency of power conversion and their overall operational characteristics are desirable.

Incident wind at even low speeds can cause the rotor blades to rotate very quickly. As would be well-understood, for a given rotational velocity, the linear velocity of a rotor blade is lowest in the region of its root—the portion of the rotor blade proximate to the shaft. Similarly, the linear velocity of the rotor blade is highest in the region of its wingtip—the portion of the rotor blade distal from the shaft. Particularly at higher linear velocities, aspects of the rotor blade can generate significant aeroacoustic noise as the rotor blade rapidly "slices" through air along its rotational path. This noise can be quite uncomfortable for people and animals in the vicinity to witness. However, the noise can also be an indicator that operation is not efficient, and maximum wingtip speed can actually be limited by such inefficiencies.

Horizontal-axis wind turbines are comprised of at least two and typically three rotor blades. The total swept path of the rotor blade(s) is considered to be the measure of the total kinetic energy available to the wind turbine in that plane. Current wind technologies are able to extract only a fraction of the kinetic energy of the incident wind. The maximum theoretical value of kinetic energy extraction from the wind—which is known as the Betz Limit—was demonstrated in 1919 by Albert Betz according to a principle known as Betz's Law. According to Betz's Law, the maximum coefficient of performance (Cp) in wind kinetic energy extraction, the Betz Limit, is 59.3%.

Current wind technologies have, in reality, a much lower Cp than the Betz Limit. Efficiencies of wind turbines have been increasing in recent years, mostly through advances in rotor blade designs. However, some nascent research has begun to explore the utilization of wind incident in the central hub portion in front of the plane of rotor blade travel to improve efficiency and yield and decrease noise emissions.

The portion in front of the central hub where the rotor blade(s) are attached may or may not be covered by a nose cone. The nose cone commonly acts as a protective shield for the hub of a wind turbine. To date, nose cones are not generally configured to aid in rotating the shaft of the wind turbine or to act in any way to produce energy. To this end, it is a common understanding that the total swept path of the rotor blade(s) is considered to be the measure of the possible kinetic energy available to the wind turbine in that plane and that the kinetic energy of the wind in upstream of the wind turbine hub is currently under-utilized.

European Patent Application No. EP2592265 to Orbrecht et al. discloses a power producing spinner for a wind turbine. This application describes an area for airfoil extension over the root area of the rotor blade(s), connecting at the hub region and an upwind airfoil portion disposed upwind of an inboard portion of each blade of the wind turbine; the wind turbine having a plurality of blades interconnected about an axis of rotation by a hub. The patent application further describes the ability of the power producing spinner to increase the efficiency of the wind turbine by increasing an axial induction to air flowing over the power producing spinner and directing an air flow outboard to aerodynamically useful regions of the blades.

U.S. Pat. No. 8,287,243 to Herr et al. discloses a spinner of a wind turbine. The air-flow in an inner rotor section may pass the rotor of the wind turbine without being used for energy production. A cylindrical spinner deflects wind around the rotor blade root(s) so that there is an increase in the efficiency of an existing wind turbine.

The control of yaw of a wind turbine is important to maintain maximal efficiencies, by containing wind incident to roughly 90 degrees from the spinning of the rotor blades. Currently, this is achieved via active systems that reside at the base of the nacelle at the point of connection with the tower, as in U.S. Pat. No. 7,944,070 to Rosenvard et al. and U.S. Pat. No. 8,899,920 to Anderson. These active systems are controlled by sensors located on the exterior of the nacelle at the rear portion from first wind incident. Thus, these sensors are informed of wind conditions, most importantly speed and direction, after the wind has passed by the rotor blades. As such, there is a delay in the information of wind speed and direction to the active yaw system at the base of the nacelle.

European Patent Application Publication No. EP 2048507 to LeClair et al. discloses sensors located on the front of a nosecone. However, the sensors send their information to an active systems of motors and gears that are not able to actively move the turbine such that maximal efficiencies are generated without a feedback loop and subsequent delay. Furthermore, these systems similarly require electrical power to operate.

Traditional nose cones are attached to the hub through a spinner. The spinner may then be attached to the hub through several methods including struts and having its form wrap around the root(s) of the rotor blade(s) to secure it in place. Most of these methods require the blades to not be present for spinner attachment, which may be fine for assembling a new wind turbine but can be time consuming and costly for retrofitting an operating turbine.

It is well known that the hubs and nacelles of a wind turbine require ventilation due to the heat that is created within them. Many techniques are known to ventilate the air within these structures.

Surface textures have also been known to improve the laminar flow over objects. These textures are often self-similar and repeating in nature. These may be recessed into the form, or project out of the form, and/or may also be U-shaped or V-shaped troughs that swerve or zig-zag in beneficial ways, or vortex generators that extend out of the form.

SUMMARY OF THE INVENTION

In accordance with an aspect, there is provided a fluid-redirecting structure comprising a rigid body having an upstream end, a downstream end, and an axis of rotation, the rigid body incorporating a plurality of troughs each spiralled from a tip at the upstream end to the downstream end about the axis of rotation, the troughs being splayed with respect to the axis of rotation thereby to, proximate the downstream end, direct incident fluid along the troughs away from the axis of rotation.

The fluid-redirecting structure described herein may either be fully integrated with, or fitted and attached to, a hub structure of a turbine such as a horizontal-axis wind turbine, in the central position thereby to replace an existing nose cone.

The fluid-redirecting structure, when associated with a wind turbine, faces incident wind flowing from an upstream location towards a downstream location, receives the wind, and rotates in response to the flow of the incident wind in unison with rotor blades of the wind turbine as the incident wind pushes against and through the troughs in its path from the upstream end through to the downstream end. Furthermore, the fluid-redirecting structure directs the incident wind reaching the downstream end of the troughs outwards and along the troughs in a direction substantially normal to the axis of rotation and thereby along the front surface of a respective rotor blade of the wind turbine.

The trough portion at the downstream end of the fluid-redirecting structure is generally aligned with an upwind power producing rotor blade portion, and in embodiments like the rotor blade may assume the shape of an airfoil and/or may form a new leading edge section of the rotor blade(s) and/or may form a new trailing edge section of the rotor blade(s).

The fluid-redirecting structure thereby acts to harness incident wind that is still upstream of the rotor blades of the wind turbine to rotate the spinner, thereby to increase the efficiency and/or decreases the noise emissions of the wind turbine as a whole through its application and use and by increasing the time over which energy extraction occurs.

Further, the direction and re-distribution of the kinetic energy of incident wind away from the axis of rotation of the turbine but against the rotor blades provides a source of kinetic energy that heretofor has been lost from the hub area, in a quiet manner.

In accordance with another aspect, there is provided a fluid-redirecting structure for a turbine comprising a rigid body attachable to a hub structure of the turbine and incorporating a plurality of spiral troughs each for receiving and directing wind incident on the rigid body against a front surface of a corresponding turbine blade.

In an embodiment, the fluid-redirecting structure can be retrofitted to existing turbines either in lieu of, or in conjunction with, a standard paraboloidal nose cone thereby to provide efficiency and power-generating benefits to the existing turbine.

The direction in which the troughs are spiralled with respect to the axis of rotation is chosen to correspond with the opposite direction of the rotational direction of the drive shaft and rotor blades. As such, a counterclockwise direction of intended rotation for the rotor blade(s) would coordinate with a clockwise spiral for the troughs of the fluid-redirecting device around the axis of rotation, whereas a clockwise direction of intended rotation for the rotor blade(s) would coordinate with a counterclockwise spiral for the troughs of the fluid-redirecting device around the axis of rotation.

The present patent application includes description of opportunities for improving on the traditional aspects of a nose cone for a wind or water turbine, as well as for a propeller for an aircraft, watercraft or spacecraft. The uniquely biologically-inspired configurations can conveniently be retrofitted onto the hub structure in front of the plane of movement of the rotor blade(s), and is self-orienting. The fluid-redirecting structures described herein aim to produce rotational motion in the drive shaft of a turbine using incident fluid, such as wind, that is in front of the plane of rotor blade travel as well as to direct such incident fluid that is in front of the hub structure to and over the power producing regions of the rotor blade(s), thus increasing the overall efficiency of the turbine by using the under-utilized energy available in the fluid around the hub area.

Through this invention, the wind turbine of the prior art will see an increase in efficiency from the wind turbine with the current invention integrated, if installed upwind from the prior art. The same increase in efficiency may also be seen if one wind turbine with the current invention integrated is installed upwind of another wind turbine with the current invention integrated.

In accordance with another aspect, there is provided a fluid-redirecting structure for a turbine comprising a rigid body attachable to at least one of a hub structure and rotor blades of the turbine and incorporating a plurality of spiral troughs each for receiving and directing fluid incident on the rigid body against a front surface of a corresponding turbine blade.

In accordance with another aspect, there is provided a fluid-redirecting structure for a propeller comprising a rigid body attachable to at least one of a hub structure and propeller blades of the propeller and incorporating a plurality of spiral troughs each for receiving and directing fluid incident on the rigid body against a front surface of a corresponding propeller blade and/or rotor blade.

Other aspects as well as advantages will be described herein.

BRIEF DESCRIPTION OF THE DRAWINGS

Embodiments of the invention will now be described with reference to the appended drawings in which:

FIGS. 5A, 5B, 5C and 5D are cross-sectional views of various alternative embodiments of retention structures at edges of troughs;

DETAILED DESCRIPTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

Figure 1:
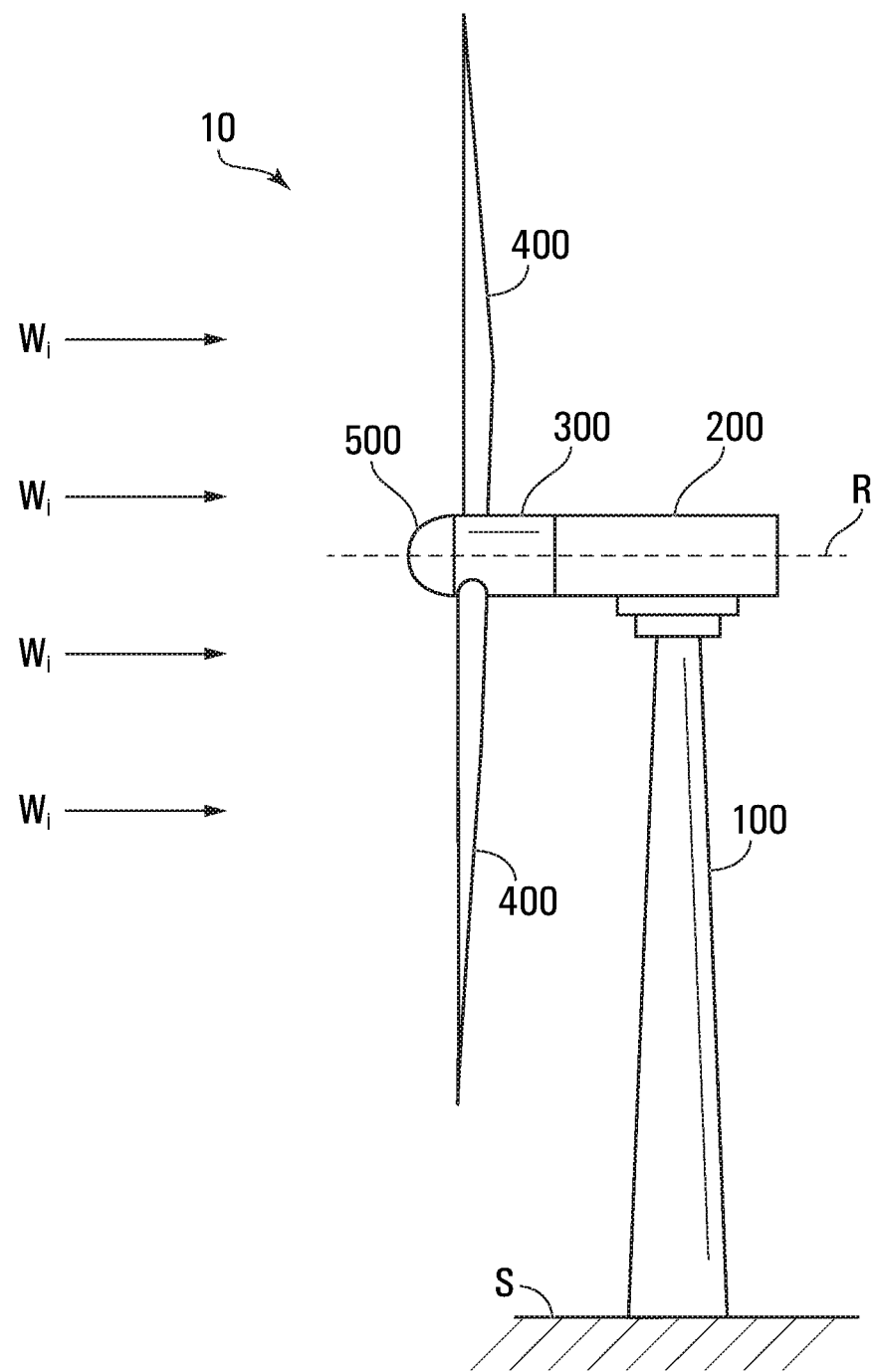
FIG. 1 is a side elevation view of a horizontal axis wind turbine, according to the prior art.

FIG. 1 is a side elevation view of a horizontal axis wind turbine 10, according to the prior art. Wind turbine 10 includes a tower 100 supported by and extending from a surface S, such as a ground surface. Supported by tower 100, in turn, is a nacelle 200 extending horizontally. A hub structure with a spinner 300 is rotatably mounted at a front end of nacelle 200 and is rotatable with respect to nacelle 200 about a rotation axis R. Spinner 300 receives and supports multiple rotor blades 400 that each extend outwardly from spinner 300. Rotor blades 400 catch incident wind $W_i$ flowing towards the wind turbine 10 and are caused to rotate. Due to their being supported by spinner 300, rotor blades 400 when rotating cause spinner 300 to rotate about rotation axis R thereby to cause rotational motion that can be converted in a well-known manner into usable electrical or mechanical power. In this sense, rotor blades 400 are each structures adapted to traverse a fluid environment, where the fluid in this embodiment is ambient air. Nacelle 200 may be rotatably mounted to tower 100 such that nacelle 200 can rotate about a substantially vertical axis (not shown) with respect to tower 100, thereby to enable rotor blades 400 to adaptively face the direction from which incident wind $W_i$ is approaching wind turbine 10. A nose cone 500 of generally a uniform paraboloidal shape is shown mounted to a front end of spinner 300 to deflect incident wind $W_i$ away from spinner 300.

Figure 2A:
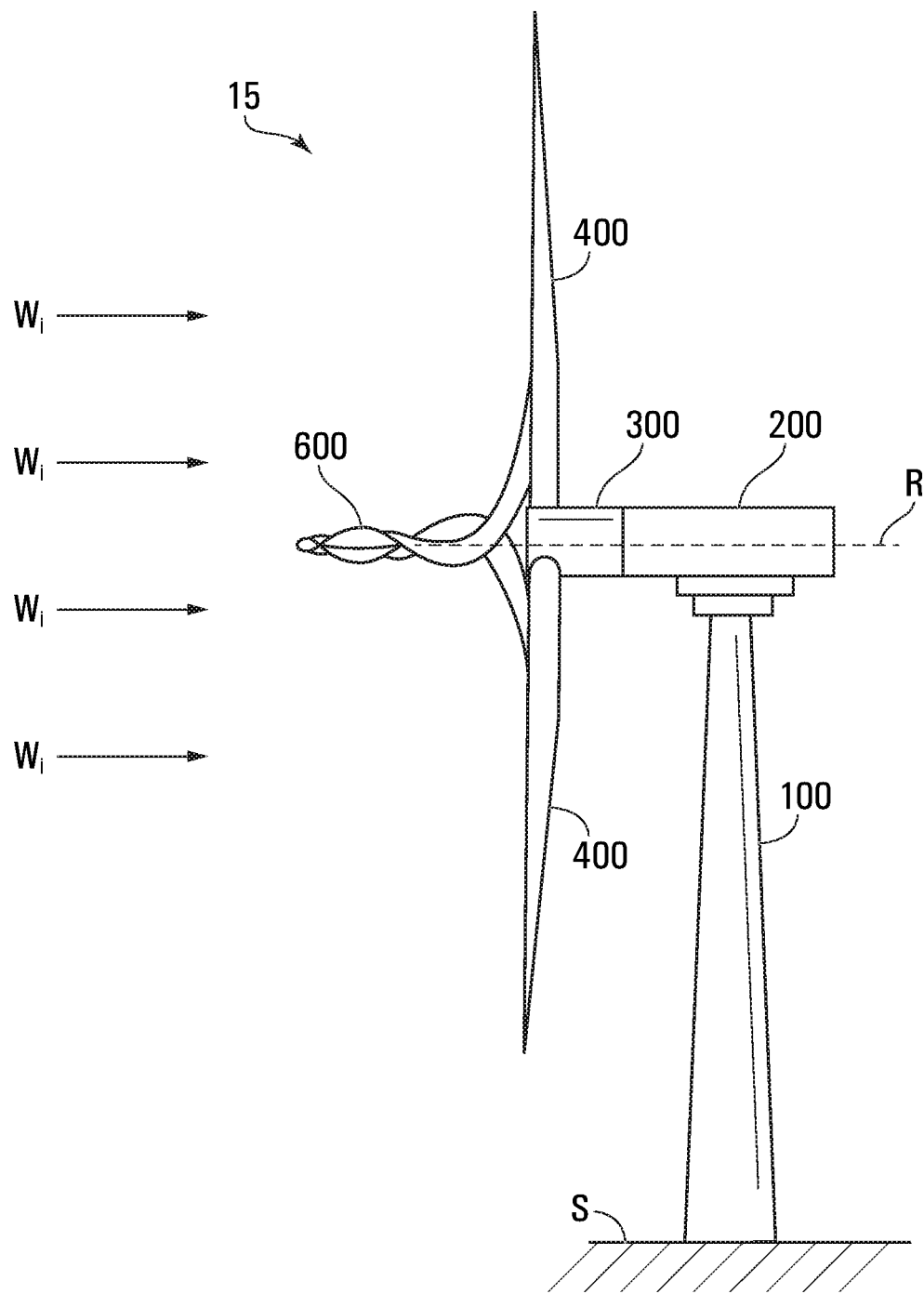
FIG. 2A is a side elevation view of a horizontal axis wind turbine incorporating a fluid-redirecting structure in accordance with an embodiment of the invention.
Figure 2B:
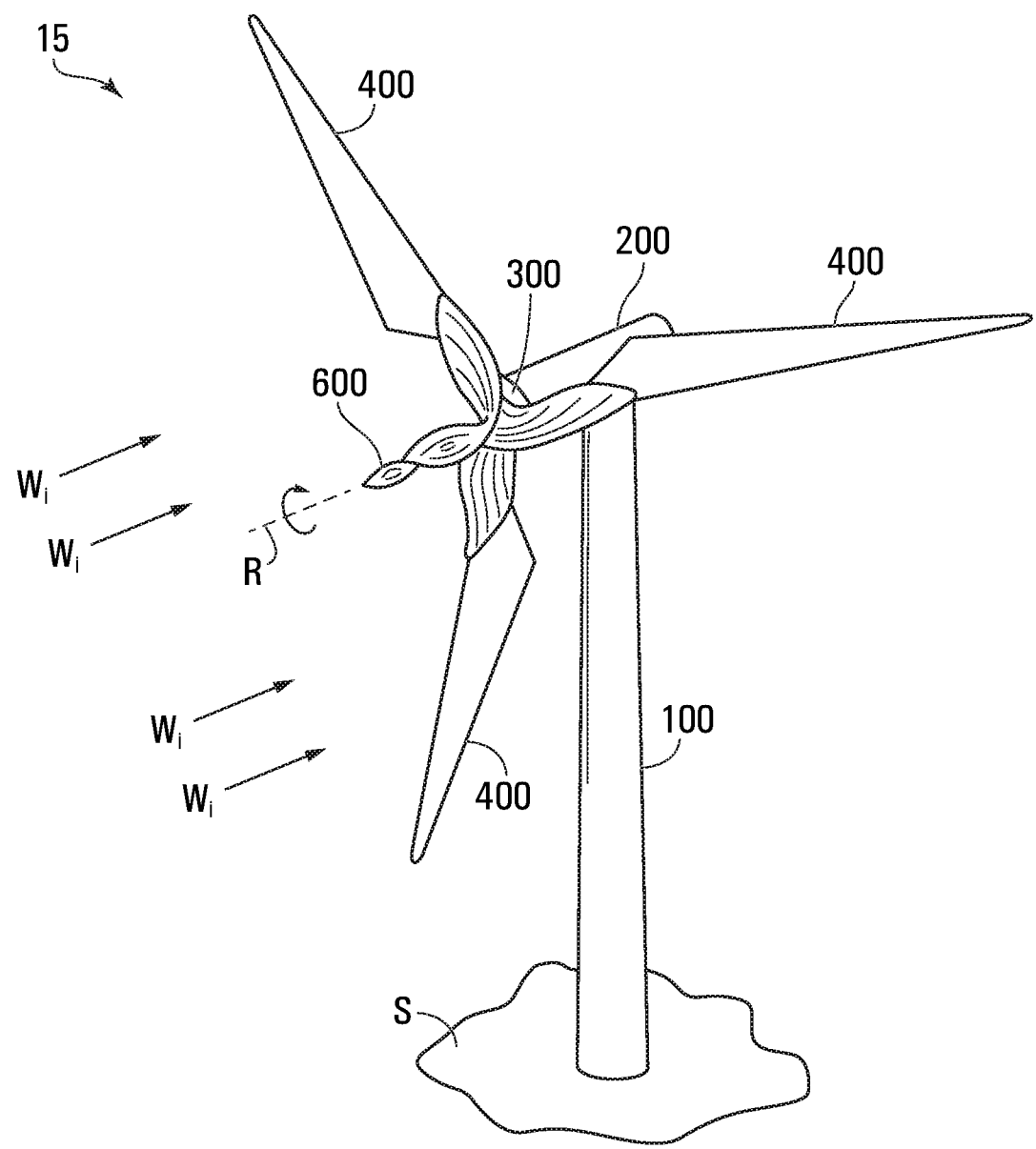
FIG. 2B is a front perspective view of the horizontal axis wind turbine of FIG. 2A.

FIG. 2A is a side elevation view of a horizontal axis wind turbine 15 incorporating a fluid-redirecting structure 600 in accordance with an embodiment of the invention, and FIG. 2B is a front perspective view of horizontal axis wind turbine 15.

Wind turbine 15 includes a tower 100 supported by and extending from a surface S, such as a ground surface. Supported by tower 100, in turn, is a nacelle 200 extending horizontally. A hub structure with a spinner 300 is rotatably mounted at a front end of nacelle 200 and is rotatable with respect to nacelle 200 about a rotation axis R. Spinner 300 receives and supports multiple rotor blades 400 that each extend outwardly from spinner 300. Rotor blades 400 catch incident wind $W_i$ flowing towards the wind turbine 15 and are caused to rotate. Due to their being supported by spinner 300, rotor blades 400 when rotating cause spinner 300 to rotate about rotation axis R thereby to cause rotational motion that can be converted in a well-known manner into usable electrical or mechanical power. Nacelle 200 may be rotatably mounted to tower 100 such that nacelle 200 can rotate about a substantially vertical axis (yaw axis, not shown) with respect to tower 100, thereby to enable rotor blades 400 to adaptively face the direction from which incident wind $W_i$ is approaching wind turbine 15.

In this embodiment, fluid-redirecting structure 600 is shown mounted to a front end of spinner 300 and is rotatable, along with spinner 300 and rotor blades 400, about rotational axis R.

Figure 3A:
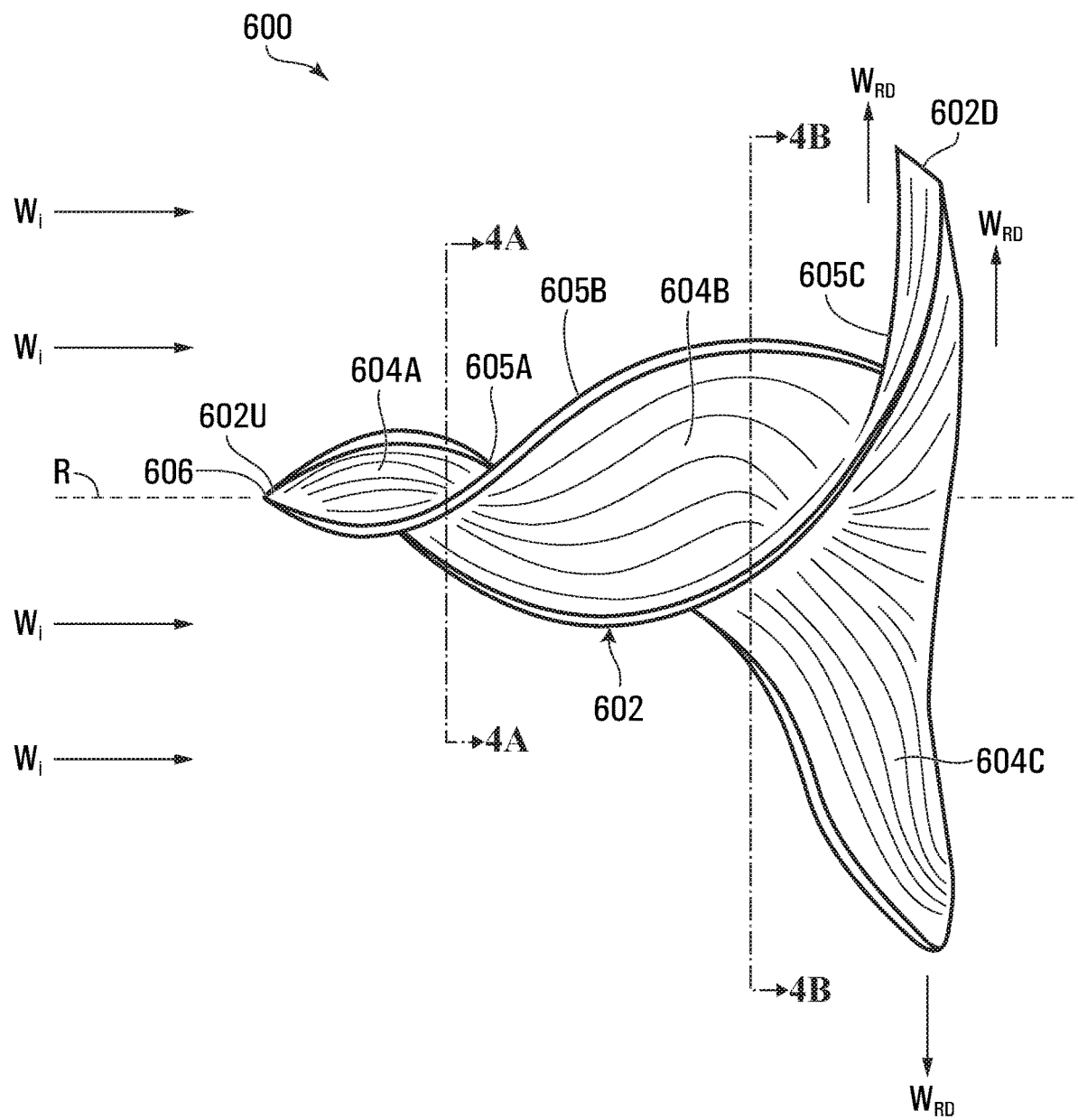
FIG. 3A is a side elevation view of a fluid-redirecting structure according to an embodiment of the invention.
Figure 3B:
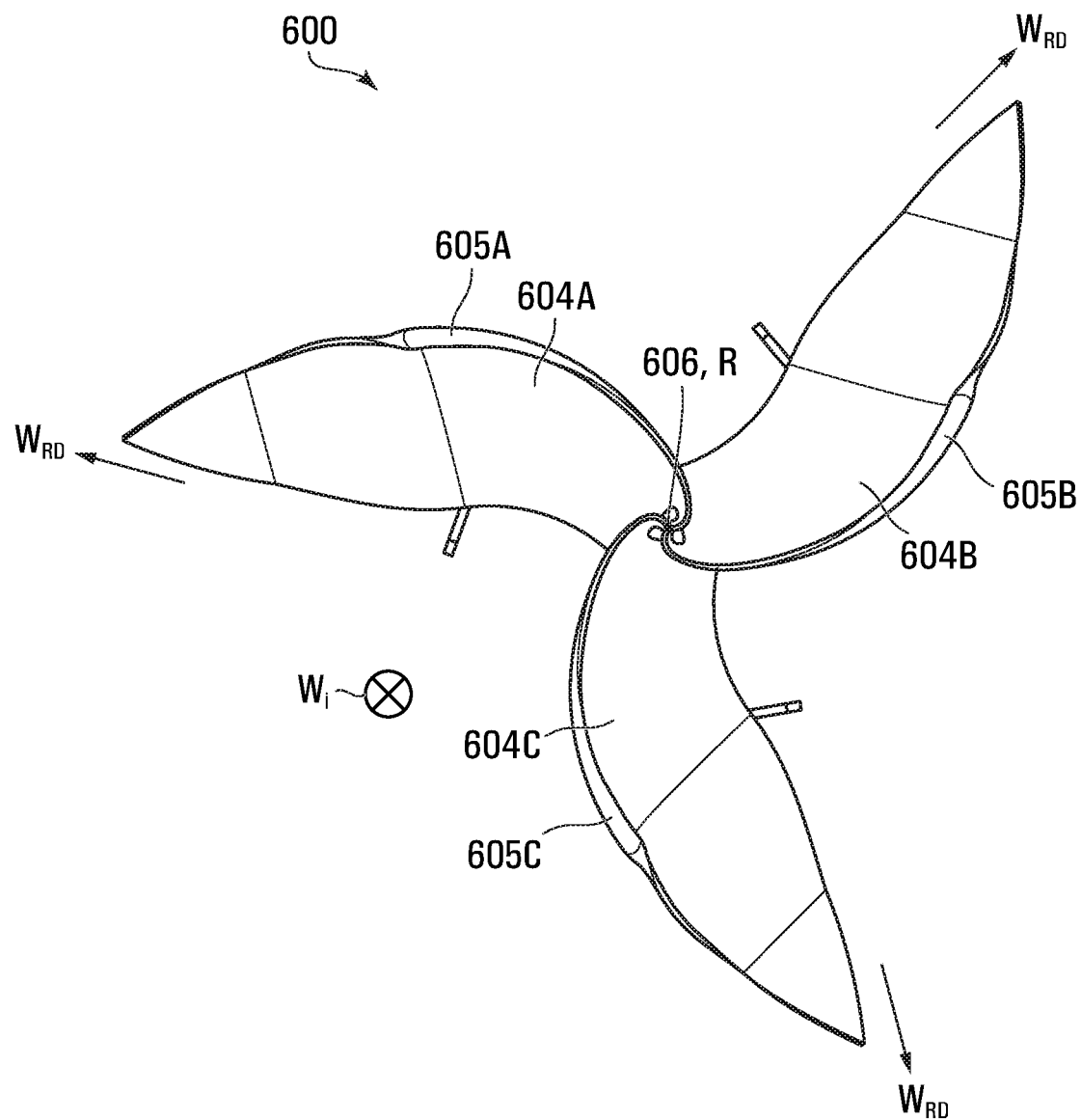
FIG. 3B is a front elevation view of the fluid-redirecting structure of FIG. 3A.

FIG. 3A is a side elevation view of fluid-redirecting structure 600, enlarged for ease of explanation, and FIG. 3B is a front elevation view of fluid-redirecting structure 600. Fluid-redirecting structure 600 includes a rigid body 602 having an upstream end 602U and a downstream end 602D. The rigid body 602 incorporates a plurality of troughs, in this embodiment three (3) troughs 604A, 604B and 604C. Each trough 604A, 604B and 604C is spiralled from a tip 606 at upstream end 602U to the downstream end 602D about rotational axis R. The troughs 604A, 604B and 604C are also each splayed with respect to the rotational axis R thereby to, proximate the downstream end 602D, direct incident fluid—in this embodiment incident wind $W_i$—along the troughs 604A, 604B and 604C in a direction substantially normal to the axis of rotation R.

In this embodiment, the troughs 604A, 604B and 604C at the upstream end 602U generally come from a point proximate to tip 606 along a direction generally parallel to the rotational axis R and then, as they progress in spiral towards the downstream end 602D splay outwards progressively away from the rotational axis thereby to re-direct incident wind $W_i$ (shown going into the page in FIG. 3B) so that the re-directed wind $W_{RD}$ flows along the front surface of rotor blades 400.

As shown particularly in FIG. 3B, each of troughs 604A, 604B and 604C is generally a single-stage format i.e., is progressively gradually increased in focal radius of the spiral from the upstream end 602U to the downstream end 602D. Furthermore, there is a corresponding gradual increase in the width of the trough from upstream end 602U to downstream end 602D. In this embodiment, each of troughs 604A, 604B and 604C is widened generally parabolically, such that there is a gradual increase in the width of the trough from upstream end 602U to downstream end 602D. In alternative embodiments, the troughs may be contoured so as to, when going from upstream end 602U to downstream end 602D, gradually increase in width, then maintain a steady width through an intermediate region such that the edges of the trough run parallel, then gradually increase in width again to the downstream end 602D. In yet another alternative embodiment, the troughs may be contoured so as to, when going from upstream end 602U to downstream end 602D, gradually increase in width, then maintain a steady width through a downstream region until the downstream end 602D without increasing again in width.

Figure 4B:
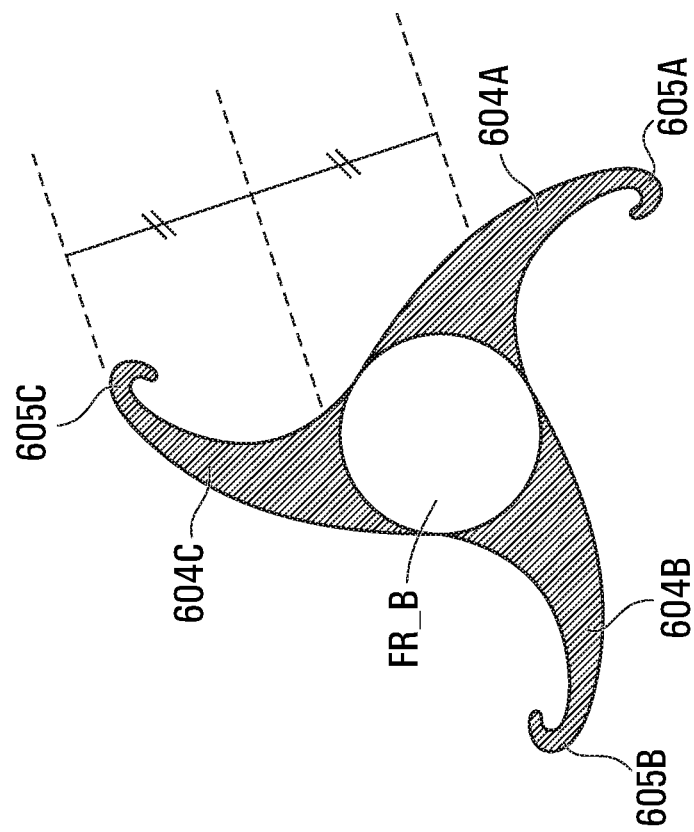
FIGS. 4A and 4B are cross-sectional views of the fluid-redirecting structure of FIG. 3A, from a position proximate the upstream end (4A) and from a position closer to the downstream end (4B)
Figure 4A:
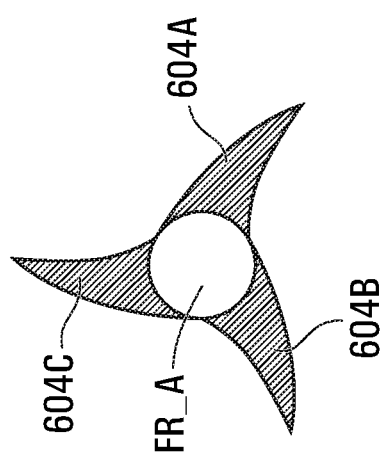

FIGS. 4A and 4B are cross-sectional views of fluid-redirecting structure 600, from a position A proximate the upstream end (shown from A in FIG. 3A) and from a position closer to the downstream end (shown from B in FIG. 3A), showing the different focal radii FR_A and FR_B of the troughs 604A, 604B and 604C, as well as the different widths of the troughs 604A, 604B and 604C. It will be noted that, in this embodiment, the width of each trough 604A, 604B and 604C progresses proportionally with the focal radius.

As shown in FIGS. 3A, 3B, 4A and 4B, each trough 604A, 604B and 604C has opposite edges extending from the upstream end 602U to the downstream end 602D. In this embodiment, one of the edges of each trough 604A, 604B and 604C incorporates respective retention structure 605A, 605B and 605C for inhibiting incident fluid—in this embodiment incident wind—from exiting a respective trough 604A, 604B and 604C and for directing the incident fluid along the trough.

In this embodiment, each retention structure 605A, 605B and 605C is an arced elongate wall that is generally a C-shape in cross section. In particular, a portion of surface of each trough 604A, 604B and 604C that faces incident wind Wi along the edge is gradually bent on itself to a maximum angle of two hundred and seventy (270) degrees. The cross-section of the troughs 127 may further be of any beneficial elliptical or bowed shape.

FIGS. 5A, 5B, 5C and 5D are cross-sectional views of various alternative embodiments of retention structures for a trough such as trough 604B, along a portion of its edge. For example, FIG. 5A is a view of a retention structure 607B that is a very-slightly arced wall the extends generally 90 degrees in an upstream direction, FIG. 5B is a view of a retention structure 609B that is a slightly arced wall with a wider radius than that of FIG. 5A and that dips slightly in a downstream direction prior to arcing in an upstream direction, FIG. 5C is a view of retention structure 605B of fluid-redirecting structure 600 as shown in FIG. 4B that extends generally 90 degrees in an upstream direction before curving, and FIG. 5D is a view of a retention structure 611B that is similar to retention structure 605B but that, like retention structure 605B, dips slightly in a downstream direction prior to arcing upstream again. In still further embodiments, the retention structure may be extended in its generally C-shape so as to be generally U-shaped in cross-section.

The retention structures inhibit incident wind Wi from spilling over the edge of the troughs thereby to keeps more wind within the troughs in the regions at which the retention structures extend from the edges.

Figure 6:
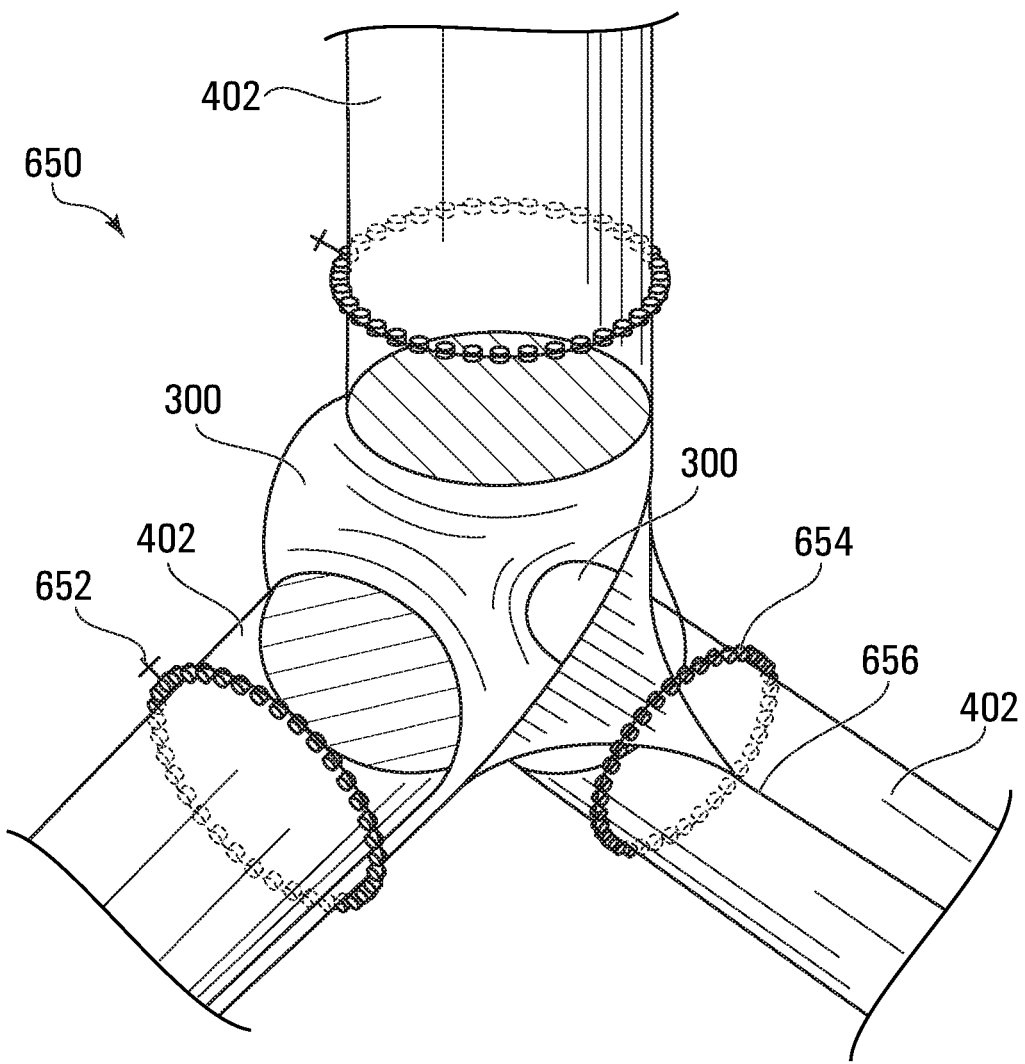
FIG. 6 is a front perspective view of an attachment structure for the fluid-redirecting structure of FIG. 3A interfacing with a hub structure of a wind turbine.

FIG. 6 is a front perspective view of an attachment structure, in the form of a nose clamp assembly 650, for interfacing the fluid-redirecting structure 600 with a hub structure of a horizontal-axis wind turbine, such as wind turbine 15. Nose clamp assembly 650 is configured such that the existing hub structure 300 and rotor blades 400 do not need to be disassembled in order to retrofit wind turbine 15 with fluid-redirecting structure 600 using nose clamp assembly 650. As shown, nose clamp assembly 650 is attached onto the existing hub structure 300 of the wind turbine 15 and is further stabilized to the roots 402 of the rotor blade 400 through support devices of nose clamp assembly 650 including brackets 656, clamps 652, and rollers and/or castors 654. Alternatively, one or more clamps, one or more braces, one or more brackets, one or more struts, one or more castors, and one or more rollers, or combinations thereof may be employed as attachment mechanisms.

It will be noted that preferably the rollers and/or castors 654 are interfaced with the fluid-redirecting structure 600 and the turbine 15 to enable nose clamp assembly 650 to accommodate selective adjustments to the pitch of each rotor blade 400 with respect to the hub structure. In this case, the rollers roll along the outer surface of the root 402 of a respective rotor blade 400, while retaining fluid-redirecting structure 600 in a central position with respect to the hub structure.

Figure 7:
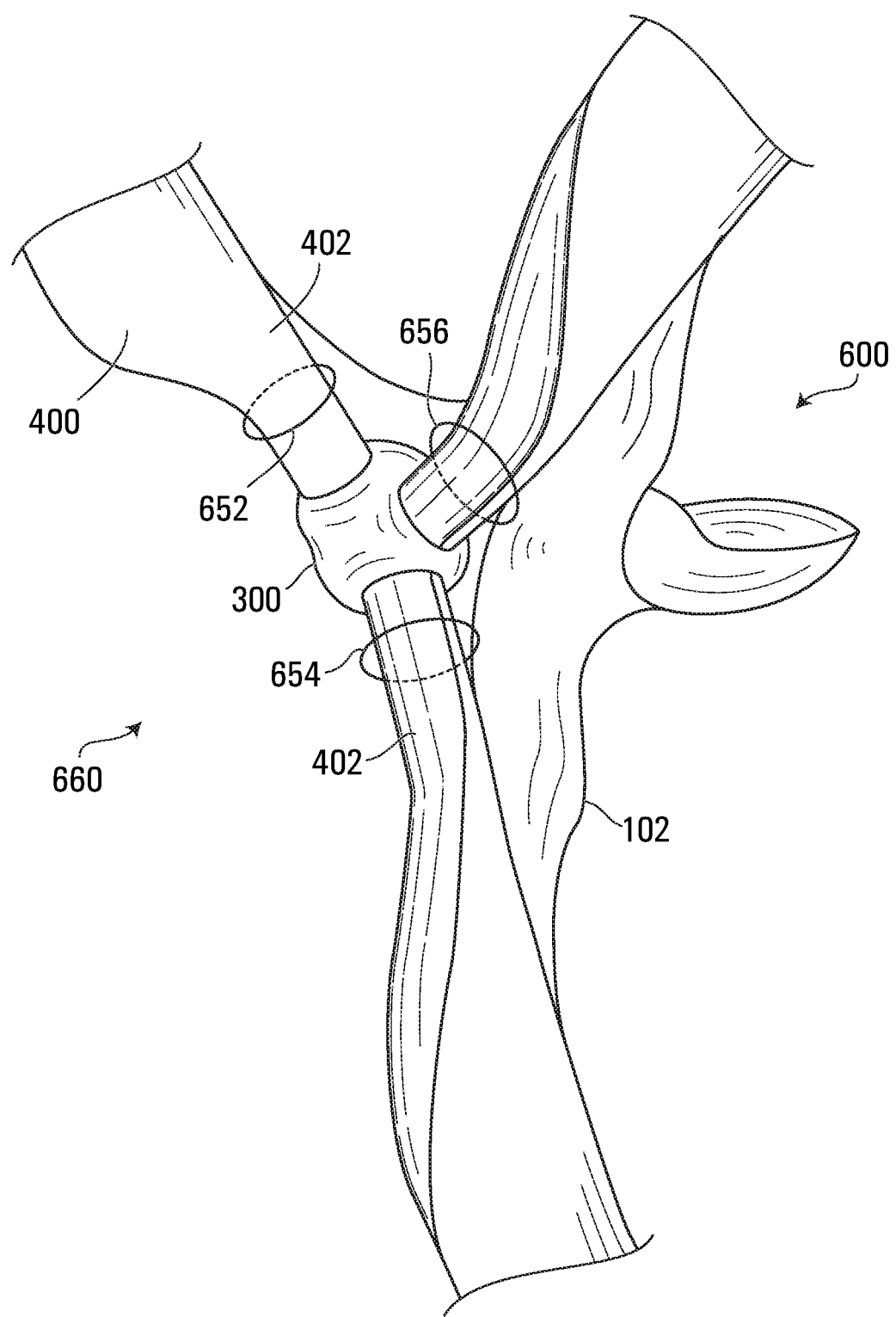
FIG. 7 is a rear perspective view of an alternative attachment structure.

FIG. 7 is a rear perspective view of an alternative attachment structure, in the form of a nose clamp assembly 660, for attaching the fluid-redirecting structure 600 to only the roots 402 of rotor blades 400 of horizontal-axis wind turbine 15. In this embodiment, the existing spinner 300 and rotor blades 500 do not have to be removed prior to wind turbine 15 being retrofitted with fluid-redirecting structure 600. As shown, nose clamp assembly 660 is stabilized to the roots 402 of the rotor blade 400 through support devices of nose clamp assembly 660 including brackets 656, clamps 652, and rollers and/or castors 654. Alternatively, one or more clamps, one or more braces, one or more brackets, one or more struts, one or more castors, and one or more rollers, or combinations thereof may be employed as attachment mechanisms.

It will be noted that preferably the rollers and/or castors 654 are interfaced with the fluid-redirecting structure 600 and the turbine 15 to enable nose clamp assembly 660 to accommodate selective adjustments to the pitch of each rotor blade 400 with respect to the hub structure. In this case, the rollers roll along the outer surface of the root 402 of a respective rotor blade 400, while retaining fluid-redirecting structure 600 in a central position with respect to the hub structure and the tip 606 in line with the axis of rotation R.

In an alternative embodiment, the attachment system may be configured to interface only with the hub structure of a wind turbine, and thereby not physically contact its rotor blades.

Figure 8:
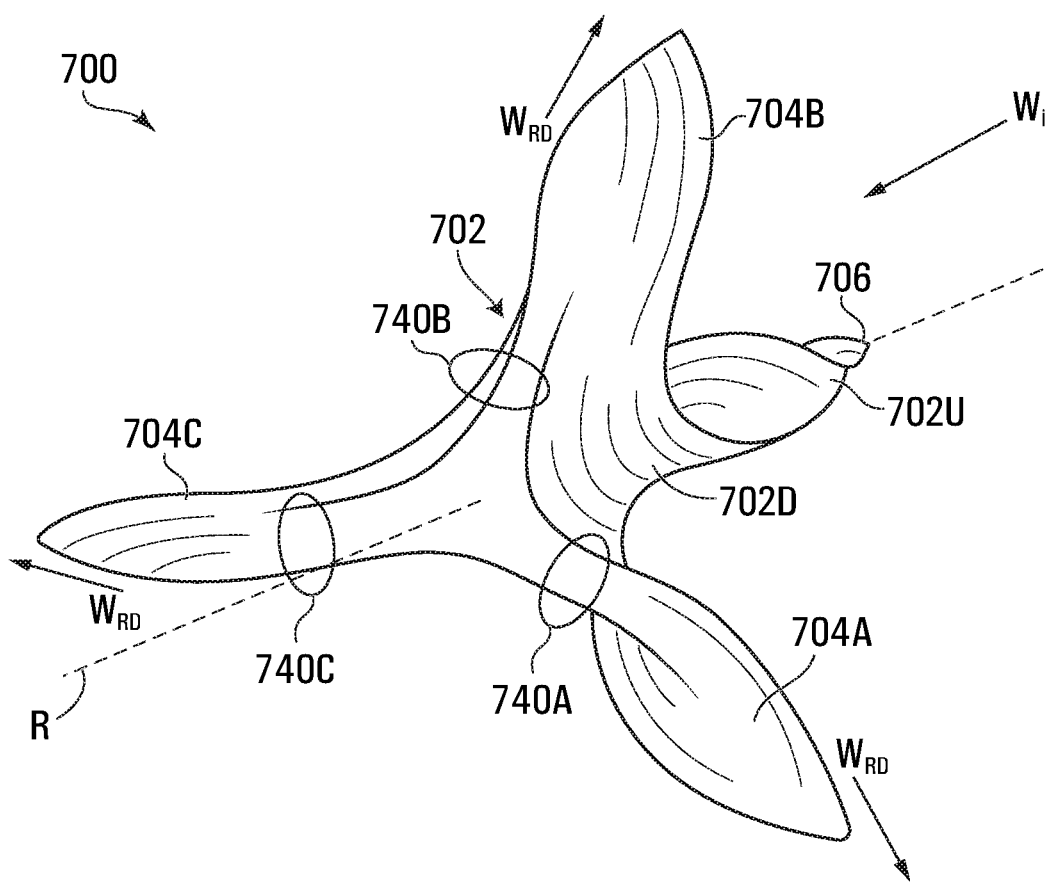
FIG. 8 is a rear perspective view of another alternative attachment structure.

FIG. 8 is a rear perspective view of an alternative fluid-redirecting structure 700. Fluid-redirecting structure 700 is similar to fluid-redirecting structure 600, in that fluid-redirecting structure 700 includes a rigid body 702 having an upstream end 702U and a downstream end 702D. The rigid body 702 incorporates a plurality of troughs, in this embodiment three (3) troughs 704A, 704B and 704C. Each trough 704A, 704B and 704C is spiralled from a tip 706 at upstream end 702U to the downstream end 702D about rotational axis R. The troughs 704A, 704B and 704C are also each splayed with respect to the rotational axis R thereby to, proximate the downstream end 702D, direct incident fluid—in this embodiment incident wind $W_i$—along the troughs 704A, 704B and 704C in a direction substantially normal to the axis of rotation R.

In this embodiment, fluid-redirecting structure 700 includes integral circular loops 740A, 740B and 740C affixed to the rear-facing side of fluid-redirecting structure 700 and each dimensioned to receive and seat a respective root 402 of a rotor blade 400 (not shown in FIG. 8) prior to the roots 402 interfacing with a hub structure of a turbine such as wind turbine 15. The integral circular loops 740A, 740B and 740C are shown without any rollers simply for clarity.

Figure 9:
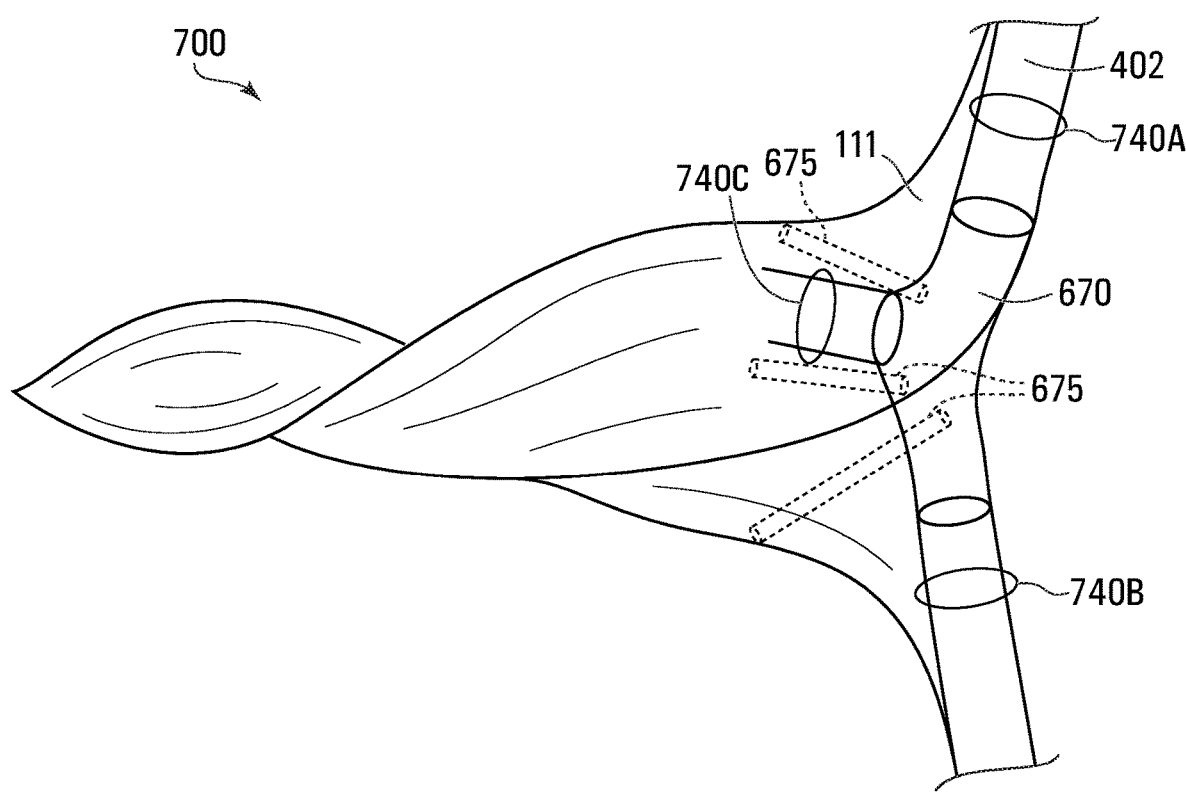
FIG. 9 is a side elevation view of the fluid-redirecting structure of FIG. 8, further showing an attachment system and the relationship between the fluid-redirecting structure and a spinner, hub structure, and rotor blades of a turbine.

FIG. 9 is a side elevation view of fluid-redirecting structure 700, further showing the hub structure 670 and its relationship between the fluid-redirecting structure 700 and a spinner 300 of the hub structure, and rotor blades 400 of a wind turbine 15. Hub structure and integral circulate loops 740A, 740B and 740C may be used to "bolt" fluid-redirecting structure 700 onto the hub structure of the wind turbine 15 thereby to retrofit wind turbine 15 with a fluid-redirecting structure, and interfaces with struts 675 that may have been part of an original nose cone 500 and/or spinner 300.

Figure 10:
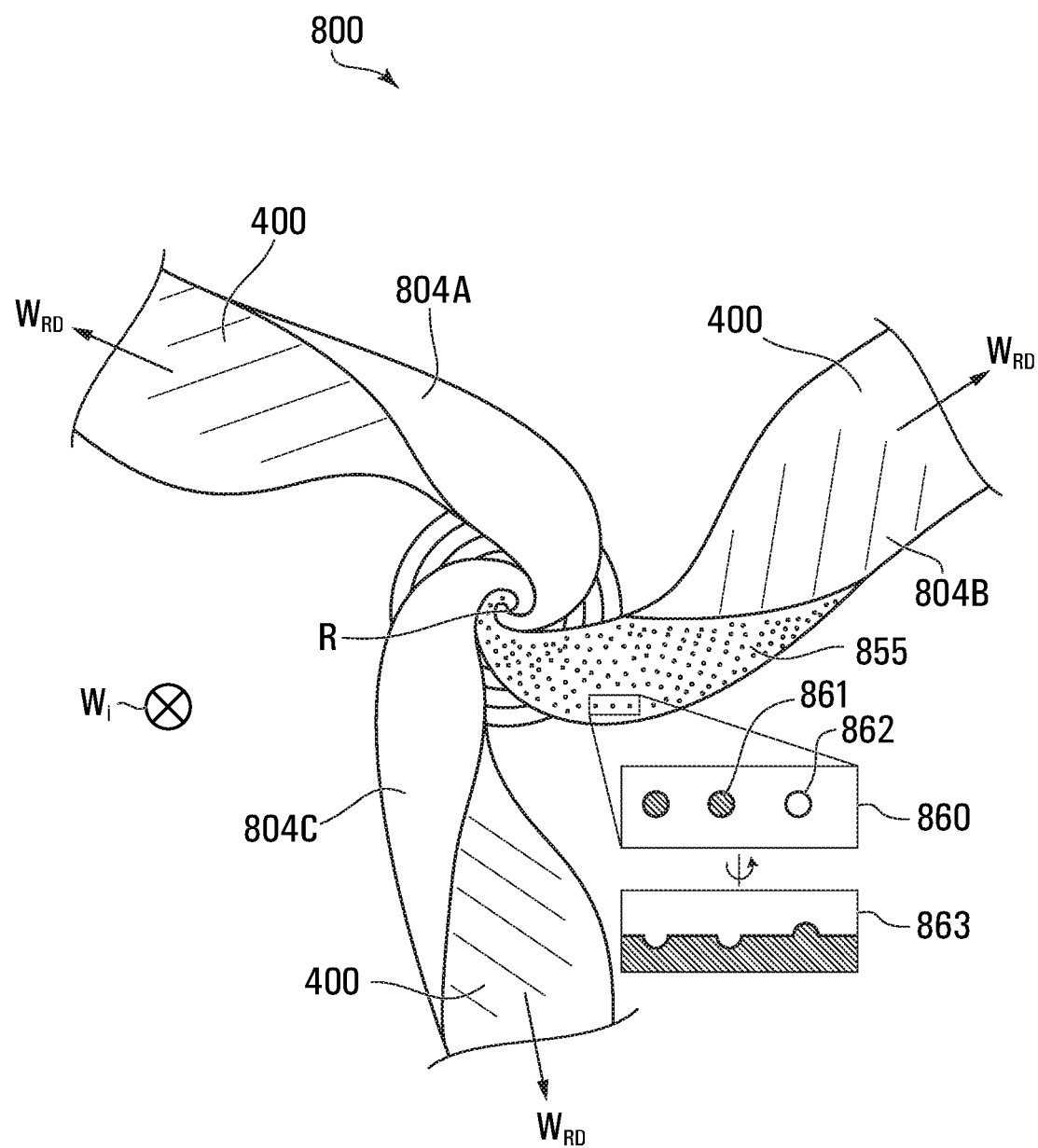
FIG. 10 is a front elevation view of a fluid-redirecting structure having surface texture according to an embodiment.

FIG. 10 is a front elevation view of a fluid-redirecting structure 800 having surface texture 855 on one of the troughs 804B and showing an intended orientation of clockwise spin. The other troughs 804A and 804C may have similar surface texture 855. Fluid-directing structure 800 may be configured very similarly to fluid-directing structures 600 and 700 and, in this embodiment, is shown terminating at the downstream end such that its troughs 804A, 804B and 804C are integrated with respective rotor blades 400 thereby to provide a continuous front surface for receiving and redirecting incident wind Wi in the directions shown by $W_{RD}$. The continuous front surface reduces interruptions in fluid flow that could otherwise contribute to undesirable fluid drag.

The texture 855 may be of any configuration that reduces fluid drag and therefore permits increased power production of the fluid-redirecting structure 800. For example, texture may include dimples. A close-up view of texture 855 can be seen at 860 which shows dimples 861 that sink beneath the surface of the trough and dimples 862 that rise above the surface. The side elevation enlarged sub figure of FIG. 10 shown at 863 illustrates the excavations of dimples 861 and their rise above the surface 862.

In an embodiment, there may also be included vortex generators on the surface of the nose cone assembly. The application of the surface texture may be done by any means during manufacture or after installation.

Figure 11:
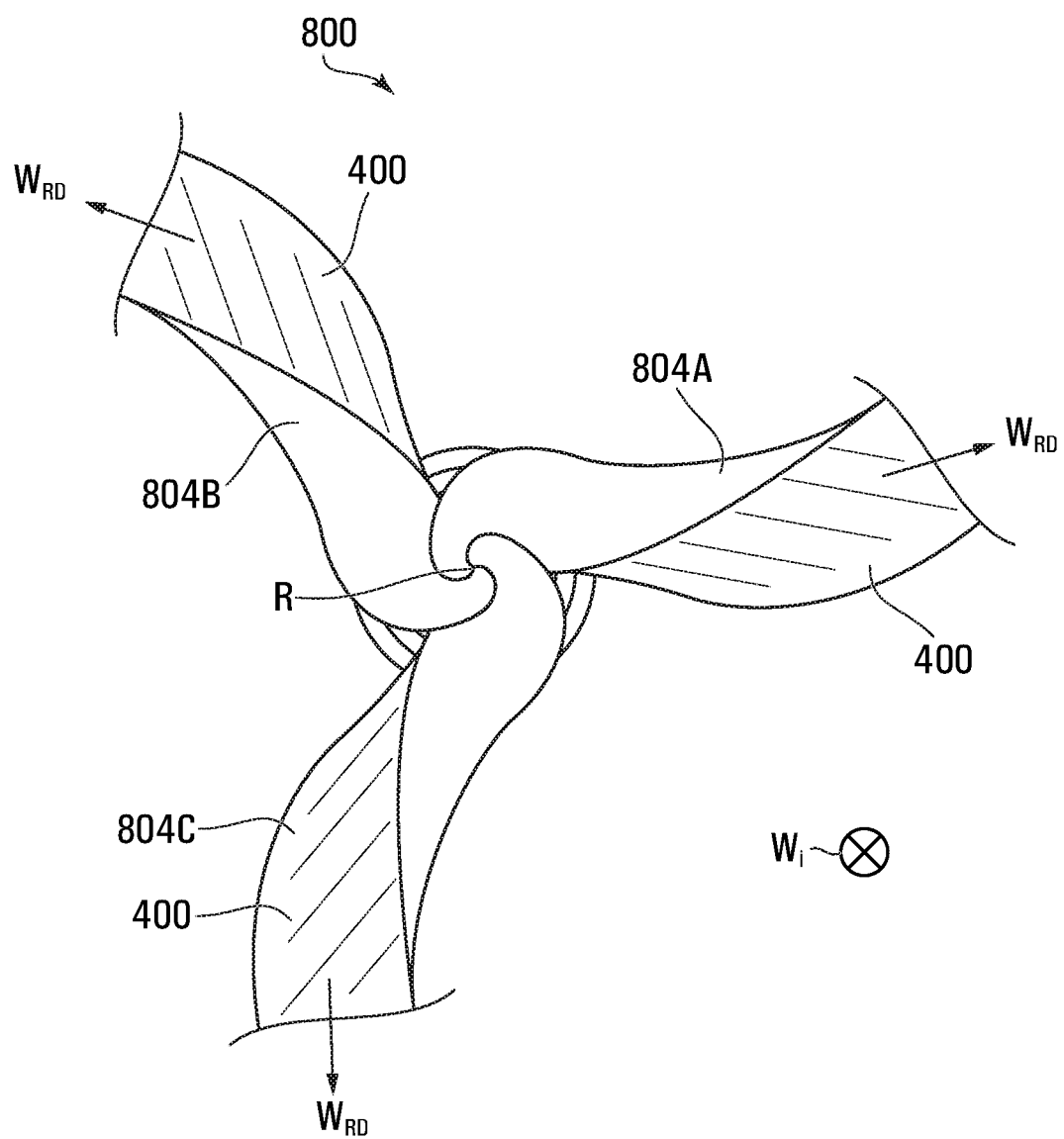
FIG. 11 is a front elevation view of a fluid-redirecting structure according to an embodiment having trough ends that terminate flush with respective rotor blades.

FIG. 11 is a front elevation view of fluid-redirecting structure 800 with the surface texture 855 not shown and showing an intended orientation of counter-clockwise spin.

It will be appreciated that the direction in which the troughs 804A, 804B and 804C are spiralled with respect to the axis of rotation R corresponds with the opposite direction in which the rotor blades 400 are intended to turn. As such, a counterclockwise direction of intended rotation for the rotor blade(s) would coordinate with a clockwise spiral for the troughs 804A, 804B and 804C about the axis of rotation R (into the page as shown in FIG. 11), whereas a clockwise direction of intended rotation for the rotor blade(s) would coordinate with a counterclockwise spiral for the 804A, 804B and 804C about the axis of rotation as in FIG. 10. In this embodiment, the troughs 804A, 804B and 804C of fluid-redirecting structure 800, where they respectively become aligned with an upwind power-producing airfoil portion of a respective rotor blade 400, may take on the cross-sectional shape of an airfoil. Alternatively or in some combination the troughs 804A, 804B and 804C may form a new leading edge section of the rotor blades 400 and/or may form a new trailing edge section of the rotor blades 400.

Figure 12:
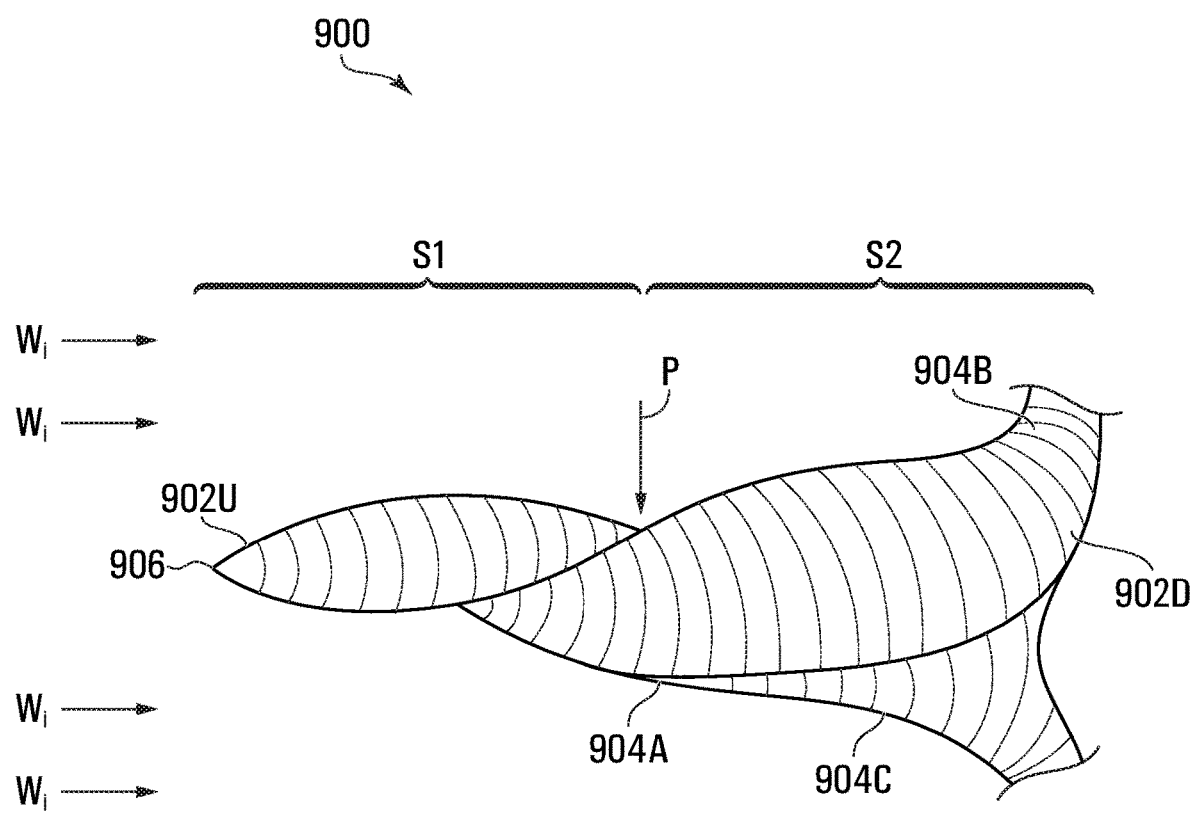
FIG. 12 is a side elevation view of an alternative fluid-redirecting structure according to an alternative embodiment of the invention.

FIG. 12 is a side elevation view of an alternative fluid-redirecting structure 900. In this embodiment, fluid-redirecting structure 900 has troughs 904A, 904B and 904C that each have a first stage S1 progressively widened from the tip 906 at its upstream end 902U to a midpoint position P that is intermediate the upstream end 902U and the downstream end 902D. Each of troughs 904A, 904B and 904C also includes a second stage S2 progressively widened from the midpoint position P to the downstream end 902D. Each trough 904A, 904B and 904C in its second stage S1 is generally wider than in its first stage S2.

Each of stages S1 and S2 generally progressively widens parabolically in shape. In this embodiment, midpoint position P is halfway between the upstream and downstream ends. However, in alternative embodiments the midpoint position P may be more that halfway between the upstream and downstream ends, such as at the three-quarters (¾) position. Furthermore, troughs 904A, 904B and 904C may spiral around the rotational axis R between about one hundred and eighty (180) degrees and about three hundred and sixty (360) degrees. The contour of the spiral may go through many deviations. For example, the spiral of a trough may begin at the front tip 906 of the nose cone and continue through to the downstream end 902D where its surface connects flush and/or comes into close proximity with the upwind power producing airfoil portion of a corresponding rotor blade 400. In embodiments, the spiral may traverse any paraboloidal shape or multitudes thereof so as to have more than two stages. After beginning at the tip 906, a parabolic contour may then taper at a position near the midpoint position P to reach a near-parallel line with the rotational axis R. At this position near the midpoint position P, a parabolic contour may then splay to a wider focal, of which half, or ninety (90) degrees of its turn is completed. The contour may then taper again near the hub structure to be parallel with the line of the drive shaft, at which point a full one hundred and eighty (180) degrees of the turn will be completed. This configuration thus allows incident wind Wi to proceed in a step-wise fashion over the multiple stages S1, S2 along the surface of a respective trough 904A, 904B, 904C, as inspired by the beak and head of a kingfisher, and be directed onto the upwind power producing airfoil portion of the corresponding rotor blade 400.

Figure 13:
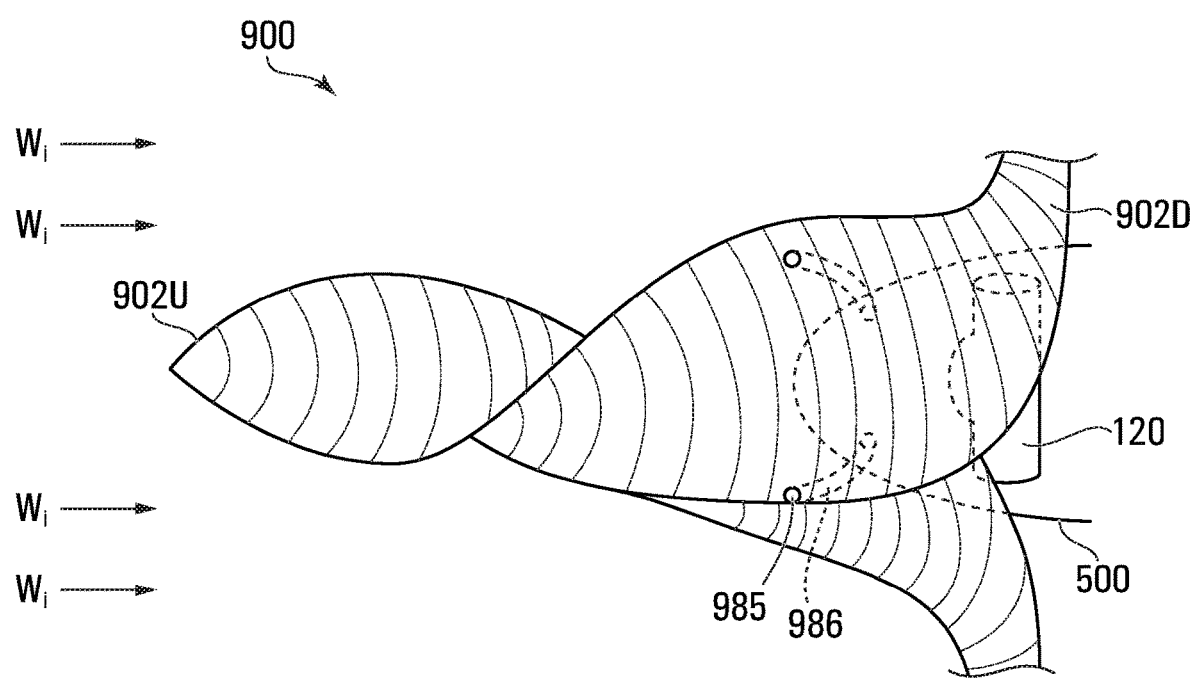
FIG. 13 is a side elevation view of the fluid-redirecting structure of FIG. 12, further showing ventilation structure and the relationship between the fluid-redirecting structure and a spinner and hub structure of a turbine.

FIG. 13 is a side elevation view of fluid-redirecting structure 900, further showing ventilation structure and the relationship between the fluid-redirecting structure and a spinner and hub structure 120 of a turbine. The ventilation structure includes ventilation inlets 985, flexible tubes and/or hoses 986, along with the relative inner positions of the existing hub structure 120 and nosecone 500. In this embodiment, the fluid-redirecting structure 900 may include ventilation inlets 985 on its surface within the second stage S2 to allow air to penetrate into the nosecone 500 and hub structure 120 and/or nacelle 200 via flexible tubes and/or hoses 986.

According to an aspect of another embodiment, the fluid-redirection structure 900 may be a monocoque assembly with a structural skin, and that is configured to enable an existing hub structure 120 with spinner 300 and/or nosecone 500 to be received at the downstream end 902D within the fluid-redirecting structure 900. In this embodiment, the fluid-redirecting structure is a one-piece unit. In alternative embodiments, the fluid-redirecting structure may be a multi-piece unit.

Figure 14:
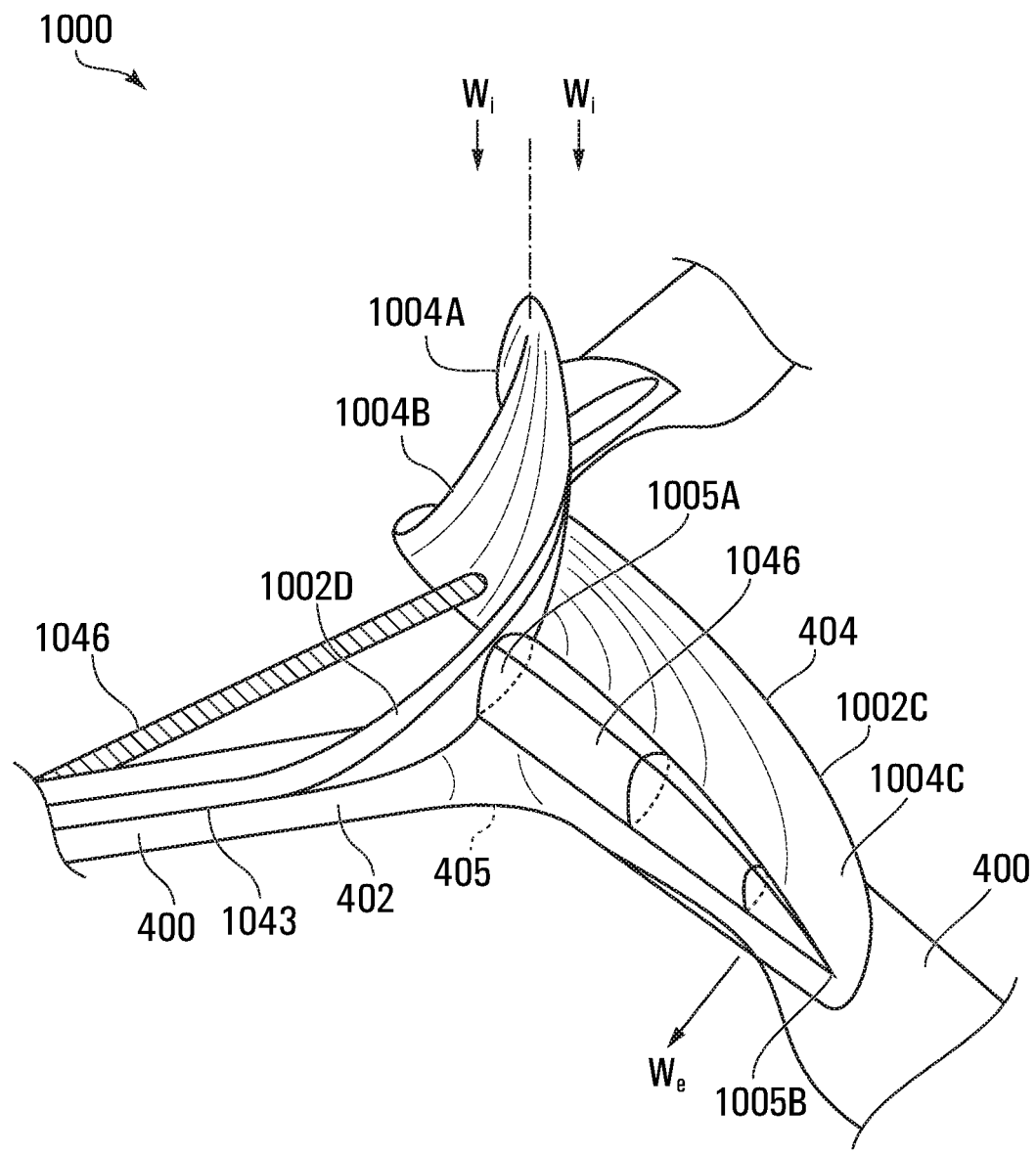
FIG. 14 is a front perspective view of a fluid-redirecting structure having troughs that are aerodynamic in cross-section, according to an embodiment.

FIG. 14 is a front perspective view of a fluid-redirecting structure 1000 having troughs 1004A, 1004B and 1004C that are aerodynamic in cross-section, along with added aerodynamic airfoil sections 1046.

According to this aspect, this may be achieved by having a gap 1043 between the outermost portion of the downstream end 1002D of the fluid-redirecting structure 1000 and an upwind power producing airfoil portion of the wind turbine rotor blade(s) 400. This method covers the root(s) region of the rotor blade(s) 402, but allows for the flexibility of the material and/or the ability to convert the outermost portion of the downstream end 1002D of the fluid-redirecting structure 1000 into an airfoil section. This effectively extends the length of the rotor blade(s) 400, creating new leading 404 and trailing 405 edges. Furthermore, another aerodynamic airfoil section 1046 may be added in a position parallel to the rotor blade(s) 400, and slightly above the outermost portion of the downstream end 1002D of the fluid-redirecting structure 1000. This has the effect of preventing any remaining kinetic energy in the wind incident Wi from exiting the outermost portion of the downstream end 1002D of the fluid-redirecting structure 1000 between the root(s) of the rotor blade(s) 402 without first doing work on the fluid-redirecting structure 1000 before hand. The work is shown here at Wii, where the wind incident is made to divert its path along an aerodynamic airfoil section 1046, thus doing work on that section and reducing its kinetic energy, exiting out at We. This aerodynamic airfoil section 1046 is attached to the rear portion of the troughs at 1005A and a front portion 1005B of the outermost portion of the downstream end 1002D of the fluid-redirecting structure 1000 through any suitable method, such that a rotational force is generated when wind incident Wi passes over it. According to another aspect, this section 1046—along with any other section of the fluid-redirecting structure 1000— may form a combination of two (2) or more detachable sections.

Theoretical Considerations:

As stated above, the Betz limit is the maximum coefficient of performance (Cp) in wind kinetic energy extraction, and is 59.3%. Known wind technologies have in reality a much lower Cp than the Betz limit. The Betz law assumes that:

1. The rotor does not possess a hub, this is an ideal rotor, with an infinite number of blades which have no drag. Any resulting drag would only lower this idealized value.

2. The flow into and out of the rotor is axial. This is a control volume analysis, and to construct a solution the control volume must contain all flow going in and out, failure to account for that flow would violate the conservation equations.

3. The flow is incompressible. Density remains constant, and there is no heat transfer.

4. Uniform thrust over the disc or rotor area.

Assuming that there is an ideal wind turbine able to extract the kinetic energy in the wind ($E_w$) at an efficiency of 59.3%, according to Betz limit, that the above ideal turbine has a frontal surface area of $SA_f$ 19.6 m² and that the wind speed is 2.78 m/s and the exterior temperature is 15° C., the energy extracted by such an ideal wind turbine is as shown in Equation 1 below, where Pw is the cubic power of the wind speed, and Da is the air density, which equals 1.225 @ 15 degrees C.:

$$E_w = [(0.5)(D_a)(SA_f)(P_w)(Cp)]$$

$$E_w = [(0.5)(1.225)(19.6\ m^2)(54.5\ m^3/s)(0.593)]$$

$$E = 387.9835\ \text{Watts} = 0.3879835\ \text{kW} \quad (1)$$

In terms of power production, over 1 hour of functioning in these conditions the turbine will produce:

$$P_{(kinetic)} = 0.3879835\ \text{kWh}$$

Small scale tests were conducted to determine the power output of various wind turbine configurations at varying wind speeds. These tests accurately reflected the size, shape, weight, proportion, blade speed—wind speed ratio of current large scale wind turbines.

As a baseline, let us assume a standard horizontal-axis wind turbine is tested on this scale. Let us also assume the same conditions, with a frontal surface area of 19.6 m², a wind speed of 2.78 m/s and the exterior temperature of 15° C. When experiments were conducted and averaged, the energy extracted by such a wind turbine was found to be:

$$E = 358.25\ \text{Watts} = 0.35825\ \text{kW}$$

As such, in terms of power production, over 1 hour of functioning in these conditions the turbine would produce $P_{(kinetic)} = 0.35825$ kWh.

This equates to a measure of 49.25% of the Betz limit, which is about average for most large-scale horizontal-axis wind turbines.

Now let us take a standard horizontal-axis wind turbine and integrate the current invention, a nose cone assembly that is able to extract a portion of the underutilize kinetic energy around the hub region. Let us also take the same conditions, with a frontal surface area of 19.6 m², a wind speed of 2.78 m/s and the exterior temperature of 15° C.. When experiments were conducted, the energy extracted by such a wind turbine was found to be E=439.30 Watts=0.43930 kW In terms of power production, over 1 hour of functioning in these conditions the turbine will produce: $P_{(kinetic)} = 0.43930$ kWh This equates to a measure of 66.23% of the Betz limit, which is +6.93% over the Betz limit.

Below is a graph giving the percentage of energy captured by the wind turbine without and with the invention described herein against varying wind speeds. The wind speeds in the conducted experiments were set in km/h, and then later converted to m/s for the Betz equation, and shown in Table 1 below.

TABLE 1

|  | .65 m/s | .83 m/s | 1.67 m/s | 1.94 m/s | 2.50 m/s | 2.78 m/s | 3.33 m/s |
| --- | --- | --- | --- | --- | --- | --- | --- |
| No nose cone | 55.06% | 53.2% | 52.18% | 52.6% | 46.6% | 49.25% | 44.6% |
| With nose cone assembly | 96.43% | 94.3% | 81.4% | 77.6% | 69.76% | 66.23% | 61.3% |

Wind turbine nose cone assembly configurations described herein are expected to improve the operational efficiency of wind turbines by harnessing more of the available kinetic energy in front of the plane of the rotor blade(s), especially around the hub region and/or increase the available kinetic energy of the wind to the rotor blade(s) and/or ventilate the hub and surrounding area and/or reduce the operational noise emissions of the nose cone and/or provide a quick attachment method for the nose cone assembly and/or reduce wind turbine operational costs.

The above-described configurations to the nose cone of a horizontal-axis wind turbine can also be applied to vertical-axis wind turbines, and both of any scale. Such improvements may apply equally well, mutatis mutandis, with such mutations as being relevant, including but not limited to, high altitude wind power (HAWP) devices, kite wind turbines, energy kites, tidal turbines, urban wind turbines, propellers for airplanes, boats, gliders and drones, jet engine caps, the bulbous bow of ships, and other things. The invention or inventions described herein may be applied to wind turbines having fewer or more blades than described by way of example in order to increase the operational efficiency of a wind turbine, to decrease maintenance costs and mechanical wear, and to increase the scalability and marketability of such wind turbines.

Some embodiments may have been described with reference to method type claims whereas other embodiments may have been described with reference to apparatus type claims. However, a person skilled in the art will gather from the above and the following description that, unless otherwise notified, in addition to any combination of features belonging to one type of subject matter also any combination between features relating to different subject matters, in particular between features of the method type claims and features of the apparatus type claims is considered as to be disclosed with this document.

The aspects defined above and further aspects are apparent from the examples of embodiment to be described hereinafter and are explained with reference to the examples of embodiment.

Other aspects may become apparent to the skilled reader upon review of the following.

Although embodiments have been described with reference to the drawings, those of skill in the art will appreciate that variations and modifications may be made without departing from the spirit and scope thereof as defined by the appended claims.

It should be noted that the term 'comprising' does not exclude other elements or steps and the use of articles "a" or "an" does not exclude a plurality. Also, elements described in association with different embodiments may be combined. It should be noted that reference signs in the claims should not be construed as limiting the scope of the claims.

Although embodiments have been described with reference to the drawings, those of skill in the art will appreciate that variations and modifications may be made without departing from the spirit, scope and purpose of the invention as defined by the appended claims.

For example, alternative construction of fluid-redirecting devices could employ a "space-frame" design with metal latticework wrapped in a polyester weave coat. Alternatively, the design could employ a voronoi pattern.

Figure 15:
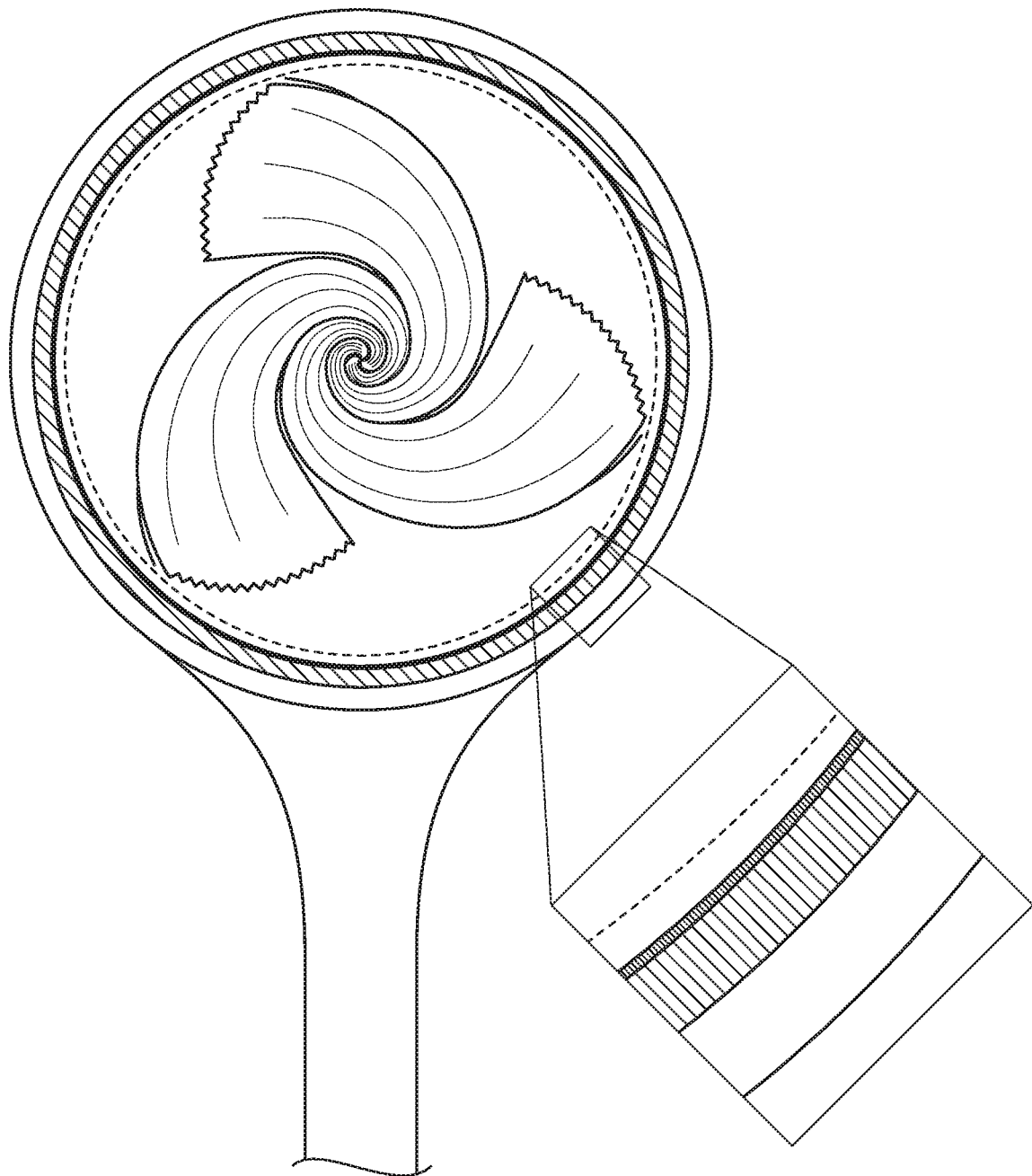
FIG. 15 is a front elevation view of an urban wind turbine incorporating a fluid-redirecting structure.

While the description above has been primarily with regard to fluid-redirecting structures for horizontal-axis wind turbines, the structures described may be applicable to other devices, such as wind turbines, tidal turbines, hydroelectric dam turbines, kite turbines, high altitude wind power (HAWP) devices, kite wind turbines, energy kites and urban wind turbines. All of these devices could be improved with a fluid-redirecting device such as described herein, within the need for attached rotor blades. For example, the nosecone can be placed within a circular structure to rotate. In particular, FIG. 15 is a front elevation view of an urban wind turbine incorporating a fluid-redirecting structure in such a manner.

All of the devices mentioned use the same device with variations in size.

Propellers for aircraft (such as a glider, civilian airplane, drone or jet engine caps), watercraft, spacecraft, turbochargers and the like could employ the above-described fluid-redirecting structure, except that power would be used in the spinning of this device, and thus it would be spun the opposite direction, to induce flow of the fluid towards the back of the structure. The spiraling would have a direction beneficial to such a configuration.

In accordance with another aspect, an ultrasonic noise inducer for the purpose of repelling any animal of flight from a horizontal or a vertical-axis wind turbine may be integrated with a fluid-redirecting structure such as is described herein, or into a standard paraboloidal nose cone or other structure. To the knowledge of the present inventor, no satisfactory solution exists to discourage or prevent flying animals of any sort from coming into contact with rotor blades or any other part of a wind turbine, that uses ultrasonic sound waves, so as to reduce or prevent animal death and damage to the wind turbine.

According to a first aspect, an ultrasonic noise inducer of 15 KHz or greater with a sound pressure at 1 meter of 95-102 dB is fitted inside the nose cone or the nacelle unit, or any other area which does not affect the aerodynamic properties of the horizontal-axis wind turbine for the purpose of repelling animals of flight from striking a horizontal-axis or vertical-axis wind turbine, wherein the ultrasonic noise inducer is placed in any vicinity around or in the wind turbine such that the desired effect of repelling the animals of flight can be achieved and the aerodynamic properties of the wind turbine are not affected, wherein the installation of the ultrasonic noise inducer occurs during or after the installation of the horizontal-axis wind turbine, wherein the power for the ultrasonic noise inducer comes from the wind turbine itself, or an external source.

What is claimed is:

1. A fluid-redirecting structure comprising:
a rigid body having an upstream end, a downstream end, and an axis of rotation,
the rigid body incorporating a plurality of troughs each spiralled from a tip at the upstream end to the downstream end about the axis of rotation, the troughs being progressively splayed parabolically with respect to the axis of rotation thereby to, proximate the downstream end, direct incident fluid along the troughs away from the axis of rotation; wherein the fluid-redirecting structure is attached to a turbine at its center axis and comprises three troughs, such that each of these troughs in their downstream section become aligned with an upwind power-producing airfoil portion of a respective rotor blade of said turbine, coming within close proximity thereof to the leading edge of this blade, creating a gap between this outer most portion of the downstream end of the fluid-redirecting device and the blade.

2. The fluid-redirecting structure of claim 1, wherein each trough is generally progressively widened from the upstream end to the downstream end.

3. The fluid-redirecting structure of claim 1, wherein each trough comprises:
a first stage progressively widened from the upstream end to a midpoint position that is intermediate the upstream end and the downstream end; and a second stage progressively widened from the midpoint position to the downstream end, wherein the second stage is wider than the first stage.

4. The fluid-redirecting structure of claim 1, wherein each trough is spiralled from about 180 degrees to about 360 degrees about the axis of rotation.

5. The fluid-redirecting structure of claim 1, wherein at least one edge of each trough extending from the upstream end to the downstream end incorporates retention structure for inhibiting incident fluid from exiting the trough at the at least one edge and directing the incident fluid therealong.

6. The fluid-redirecting structure of claim 5, wherein the retention structure comprises an arced elongate wall.

7. The fluid-redirecting structure of claim 1, wherein the troughs form a new leading edge section or a new trailing edge section of the fluid-redirecting structure.

8. The fluid-redirecting structure of claim 1, further comprising:
an attachment mechanism for rotatingly attaching the fluid-redirecting structure to a hub structure of a horizontal-axis turbine.

9. The fluid-redirecting structure of claim 1, further comprising:
an attachment mechanism for rotatingly attaching the fluid-redirecting structure to roots of rotor blades of a horizontal-axis turbine, wherein the attachment mechanism is adapted to accommodate selective adjustments to the pitch of each rotor blade with respect to a hub structure of the horizontal-axis turbine, the attachment mechanism including rollers that roll along an outer surface of a root of a respective rotor blade to cause the selective adjustments to the pitch.

10. The fluid-redirecting structure of claim 1, wherein an inner surface of each trough is textured to reduce fluid drag.

11. The fluid-redirecting structure of claim 1, wherein ventilation structure extends from at least a portion of the inner surface of a trough towards the downstream end.

12. A turbine comprising a fluid-redirecting structure as recited in claim 8, wherein the fluid-redirecting structure is attached to a hub structure of the turbine via the attachment mechanism.

13. A turbine comprising a fluid-redirecting structure as recited in claim 9, wherein the fluid-redirecting structure is attached to rotor blades of the turbine via the attachment mechanism.

14. A turbine comprising a fluid-redirecting structure as recited in claim 1, wherein the fluid-redirecting structure is integrated with a hub structure of the turbine.

15. A propeller comprising a fluid-redirecting structure as recited in claim 1.

16. The propeller of claim 15, wherein the fluid-redirecting structure is attached to rotor blades of the propeller via an attachment mechanism.

17. The propeller of claim 15, wherein the fluid-redirecting structure is attached to a hub structure of the propeller via an attachment mechanism.

18. The propeller of claim 15, wherein the fluid-redirecting structure is integrated with a hub structure of the propeller.

19. A fluid-redirecting structure for a turbine, comprising:
a rigid body attachable to at least one of a hub structure and rotor blades of the turbine and incorporating a plurality of spiral troughs each for receiving and directing fluid incident on the rigid body against a front surface of a corresponding turbine blade; wherein the fluid-redirecting structure is attached to a turbine at its center axis and comprises three troughs, such that each of these troughs in their downstream section become aligned with an upwind power-producing airfoil portion of a respective rotor blade of said turbine, coming within close proximity thereof to the leading edge of this blade, creating a gap between this outer most portion of the downstream end of the fluid-redirecting device and the blade.

20. The fluid-redirecting structure of claim 1, further comprising:
one or more sensors associated with the upstream end for sensing wind direction and/or speed.

21. The fluid-redirecting structure of claim 1: wherein each trough comprises:
a first stage progressively widened from the upstream end to a midpoint position that is intermediate the upstream end and the downstream end; and
a second stage that then maintains this width and proceeds to a downstream end without increasing again in width, and has a cross-sectional shape of an airfoil.

* * * * *